United States Patent
Peters et al.

(10) Patent No.: US 12,005,615 B1
(45) Date of Patent: Jun. 11, 2024

(54) SYSTEMS, COMPONENTS, AND METHODS FOR LOW PRESSURE DELIVERY OF PLURAL COMPONENT FOAM SYSTEMS COMPRISING SOLID PARTICLES FROM UNPRESSURIZED SUPPLY SOURCES

(71) Applicant: Spray Foam Systems, LLC, Greensboro, GA (US)

(72) Inventors: Thomas Joseph Peters, Greensboro, GA (US); James F. Peterson, Buckhead, GA (US); David H. Faulkner, Sarasota, FL (US); William G. Springer, Dallas, GA (US)

(73) Assignee: SPRAY FOAM SYSTEMS, LLC, Greensboro, GA (US)

( * ) Notice: Subject to any disclaimer, the term of this patent is extended or adjusted under 35 U.S.C. 154(b) by 0 days.

(21) Appl. No.: 18/072,388

(22) Filed: Nov. 30, 2022

(51) Int. Cl.
| | | |
|---|---|---|
| B29C 41/00 | (2006.01) | |
| B29C 41/10 | (2006.01) | |
| B29C 41/36 | (2006.01) | |
| B29K 75/00 | (2006.01) | |
| B29K 105/00 | (2006.01) | |
| B29K 105/04 | (2006.01) | |

(52) U.S. Cl.
CPC ............ *B29C 41/003* (2013.01); *B29C 41/10* (2013.01); *B29C 41/365* (2013.01); *B29K 2075/00* (2013.01); *B29K 2105/0026* (2013.01); *B29K 2105/04* (2013.01)

(58) Field of Classification Search
None
See application file for complete search history.

(56) References Cited

U.S. PATENT DOCUMENTS

| | | | |
|---|---|---|---|
| 4,060,572 | A | 11/1977 | Widmann |
| 4,169,545 | A | 10/1979 | Decker |
| 5,529,245 | A | 6/1996 | Brown |
| 5,893,486 | A | 4/1999 | Wasmire |
| 6,131,823 | A | 10/2000 | Langeman |

(Continued)

FOREIGN PATENT DOCUMENTS

WO  2021229044 A1  11/2021

OTHER PUBLICATIONS

"Nordson 2K Products Mixer Accessories", Nordson EFD product information sheet; date unknown, retrieved Aug. 1, 2022.

(Continued)

*Primary Examiner* — Jeffrey D Washville
(74) *Attorney, Agent, or Firm* — Thomas | Horstemeyer, LLP

(57) ABSTRACT

Various examples are provided related to polyurethane spray foam and its application. In one example, a method includes providing a system including a polyurethane spray foam ("SPF") raw material supply, a fluid handling system, an air source, a heated hose, a whip hose, and a metal stray gun. Each of part A and part B material streams, either or both of which include particles, are generated by the system and conveyed by the system through the system and into a disposable mixing nozzle engaged with the metal stray gun. A mixture of the part A and part B material streams can be applied, via the disposable mixing nozzle, to a surface or into a mold at a pressure of 250 psi or less. A polyurethane spray foam coating generated from the method can be applied at a thickness of from about 0.5 inches to about 12 inches.

19 Claims, 6 Drawing Sheets

(56) References Cited

U.S. PATENT DOCUMENTS

| | | |
|---|---|---|
| 6,347,752 B1 | 2/2002 | Davidson et al. |
| 6,527,203 B2 | 3/2003 | Hurray et al. |
| 6,533,189 B2 | 3/2003 | Kott et al. |
| 7,717,357 B2 | 3/2010 | Gantenbein et al. |
| 8,568,061 B2 | 10/2013 | Kalinowski |
| 9,211,552 B2 | 12/2015 | Gantenbein et al. |
| 9,745,440 B2 | 8/2017 | Stahl |
| 10,968,326 B2 | 4/2021 | Phillips |
| 11,184,689 B2 | 11/2021 | Lange et al. |
| 11,383,253 B2 | 7/2022 | Peters |
| 2005/0023296 A1 | 2/2005 | Bien |
| 2005/0035220 A1 | 2/2005 | Brown |
| 2006/0022067 A1 | 2/2006 | Bhatia |
| 2010/0163640 A1* | 7/2010 | Ganzer ................. B29B 7/823 222/4 |
| 2012/0217267 A1 | 8/2012 | Bunoz et al. |
| 2013/0197113 A1* | 8/2013 | Stahl ................. C08K 5/34922 521/123 |
| 2014/0166775 A1* | 6/2014 | Courier ................ G05D 11/132 239/73 |
| 2015/0360853 A1 | 12/2015 | Nicmanis |
| 2016/0044909 A1 | 2/2016 | Lampe |
| 2016/0184847 A1 | 6/2016 | Hummerlund |
| 2016/0188447 A1 | 6/2016 | Amego et al. |
| 2018/0056311 A1* | 3/2018 | Miller ................. B05B 12/1445 |
| 2018/0104709 A1* | 4/2018 | Peters ........................ C08J 9/30 |
| 2018/0192167 A1* | 7/2018 | Lange ................ G05D 16/2066 |
| 2020/0261931 A1* | 8/2020 | Gantenbein ............ G01K 13/02 |

OTHER PUBLICATIONS

Graco; Reactor 3, "Smart drum-to-gun spray technology", date unknown, retrieved Aug. 1, 2022.

Nordson EFD Solutions: "Meter Mix Valves for 2K mix-and-dispense application", date unknown, retrieved on or about Aug. 1, 2022.

Graco, "Reactor 2 Ratio Assurance System, Prevent, Detect and Monitor Off-Ratio Conditions", Date unknown retrieved on or about Aug. 1, 2022.

Tech Tip # Draft; Low Pressure Spray Foal Systems; Spray Polyurethane Foam Alliance, Apr. 2005.

International Search Report PCT/US22/16040 dated May 3, 2022.

* cited by examiner

SYSTEMS, COMPONENTS, AND METHODS FOR LOW PRESSURE DELIVERY OF PLURAL COMPONENT FOAM SYSTEMS COMPRISING SOLID PARTICLES FROM UNPRESSURIZED SUPPLY SOURCES

BACKGROUND OF THE DISCLOSURE

Polyurethane spray foam ("SPF") is a versatile material that is widely used in applications such as in construction for insulation (e.g., weatherization, sound, and vibration). SPF is typically applied by spraying an uncured mixed foam comprising reactive parts A and B into or onto walls and ceilings. The foam then expands and cures to form an airtight seal that is also moisture tight (for closed cell foams) to provide insulating properties, as well as other benefits.

As is well known, when an isocyanate-containing material as the "A side" is combined with polyol-containing as the "B side" in the presence of a blowing agent, a foam will be formed. The A side of a spray polyurethane system is commonly comprised of methylene diphenyl diisocyanate (MDI) and polymeric methylene diphenyl diisocyanate (pMDI). The B side is typically a blend of polyols, catalysts, solid or liquid blowing agents, fire-retardant/resistant materials and surfactant. The polyols in the B side are part of the chemical reaction to generate the foam. The remaining ingredients in the B side can serve different purposes to help control the creation of the foam bubbles (the "cells") in an optimal way, and to provide the various characteristics of the finished foam product (flame retardancy, for example). After the chemicals are combined in a mixing operation and the reaction commences, foam curing occurs rapidly. When applied to a surface during construction of a new building or in a void area in existing construction (e.g., attic, behind a wall) SPF will cure in place and a durable surface coating will be formed to generate the desired properties.

SPF is traditionally applied from either high pressure or low-pressure systems, where the pressure number is in relation to how the material moves through the hose and out of a dispenser (e.g., a spray gun or applicator) engaged at the end of the hose. Each of these categories of SPF are functionally distinct, using different application equipment, materials supply, operational instructions, and technician personal protection equipment (PPE) requirements. Moreover, the use cases can differ markedly in prior art systems.

High-pressure SPF is dispensed from spray guns by mixing of parts A and B. The chemicals are delivered to the spray gun from unpressurized supply tanks, typically 55-gallon drums, via a high pressure proportioner operational with transfer pumps and heaters. The term "high pressure" defines pressures of greater than 250 psi at the spray gun nozzle but, in practice, the pressures used to apply high pressure SPF are much greater, namely typically 1200 psi to about 1800-1900 psi. The fluid handling system (e.g., "proportioner") heats each of the material streams delivered from the respective supply sources and delivers metered amounts of parts A and B to and through a heated hose length in the defined proportions (e.g., 1:1, 2:1, 3:1, etc.) under pressure to a metal spray gun. Upon reaching the spray gun, each of the pressurized materials streams is individually communicated to a location at or near the end of the spray gun to combine for mixing via impingement, followed by delivery of the foam, as an example, to a structural surface for installation of insulation. As would be appreciated, flow of the parts A and B materials through the SPF system and onto the surface is controlled by a technician, for example, by his engagement of a trigger or other activator on the spray gun whereby the foam is delivered to a structural surface.

The high-pressure SPF method allows large amounts—or "high volumes"—of foam to be dispensed in short times (e.g., up to 30 lbs. or per minute depending on application use case), meaning that these systems have utility when speed of application is desirable. The supply of chemical in the standard 55-gallon drums or larger totes makes this process well-suited for commercial operations not just because of the larger volumes that can be dispensed, but also because these drums do not require particularly specialized storage and disposal techniques.

Low-pressure SPF chemicals are delivered from pressurized containers. The parts A and B sides are combined in a static mixing nozzle chamber at room temperatures and at significantly lower pressures than those of high-pressure SPF. The term "low pressure" defines pressures of less than 250 psi as the foam components exit the spray gun nozzle and enter the environment. Prior art low pressure SPF systems generate a much lower output of 5-7 lbs. per minute; however, the decreased chemical emissions allow for a faster jobsite reentry time of 2 hours of less. The pressure needed to appropriately mix the chemicals to generate the chemical reaction is supplied by the pressure in each container, as well as by blowing agents/propellants that can be included in the B side container. Since the A and B side components are dispensed from pressurized containers that must be small enough to transport safely, the amount of material that can be dispensed at any one time is also lower. Once emptied, these containers are either disposed of as landfill waste or can be returned to a supplier, much in the same way that propane tanks are handled. The increased safety profile and lower dispensing amounts require tradeoffs: these prior art low pressure systems are best suited for small projects, such as for existing construction where remodeling and energy upgrades may be relevant.

SPF is also used worldwide in industrial markets for applications such as recreational vehicle manufacturing, boat manufacturing, mobile home manufacturing, and other types of industrial manufacturing applications where adhesive, sealant, and insulation characteristics are pertinent. In addition, SPF is used for geotechnical applications such as void fill and lifting and leveling of surfaces that have sunk due to unstable soils. Further applications include structural insulation panels used in commercial and residential.

SPF systems can, in some applications, include fire-retardant/resistant properties, for example, as required by building codes and other relevant regulations. U.S. Pat. No. 9,745,440, the disclosure of which is incorporated herein in its entirety discloses polyurethane foam systems comprising intumescent materials such as graphite and modified graphite materials. The inventors herein understand that, while the '440 patent states that the components therein can be sprayed, poured, or injected, in practice systems using the systems and methods of the '440 patent are most commonly commercially used with high pressure spray foam systems. In this regard, it has been observed by the inventors herein that during impingement processing using such high pressure systems, the intumescent particles can churn or swirl with the mixing chamber. Such high velocity movement and associated centripetal force in the chamber causes the particles to separate in the impingement mixing chamber. This, in turn, can result in the solid particles being forced out of the isocyanate/polyol mixture in some volumes to cause a foam mixture having an uneven distribution of fire-retardant/resistant particles throughout a thickness and at the surface after the foam is applied to a surface. Additionally, it has been seen that the solid particles may be inclined to clog impingement ports more quickly than with a particle free isocyanate/polyol mixture.

Particle addition can also be relevant to imparting conductivity to a foam, for example, in the use case of pipeline construction. In this regard, to provide corrosion resistance, a pipeline can be configured with electrical currents that reduce the propensity of a metal pipeline system to fail over time. Any polyurethane foam that is used to coat the pipeline would be required to not negatively affect the corrosion resistance thereof. In this regard, conductive particles can be added to the uncured foam materials supplies. Of course, to impart the required degree of conductivity to the cured foam, the added conductive particles should be consistently distributed throughout the cured foam, which is not always possible using high pressure SPF foam delivery methods.

Particle addition also has relevance to polyurethane foam manufacture to increase the density of foam pads, for example. Applications of requiring delivery of densifying materials, such as fillers, are by definition "dense." This means that it can be difficult to deliver such materials evenly from a high pressure SFP system Colorants, such as dyes or pigments, are also provided as solid particles; however, given the problems noted with the uneven distribution of solid particles from high pressure delivery systems, it is not currently possible to deliver colorants directly from either or both of the parts A or B materials streams.

There remains a need for improved methods to apply plural component systems comprising particles where a high volume of SPF can be delivered without generating the problems associated with particles when delivered from high pressure SPF applications. The present disclosure provides this and other improvements.

SUMMARY OF THE DISCLOSURE

Aspects of the present disclosure are related to polyurethane spray foam and its application. Such methods and systems can be utilized for, e.g., application of a polyurethane spray foam mixture onto a surface or into a mold. In one aspect, among others, a method of applying a polyurethane spray foam onto a surface or into a mold comprises providing a system comprising each of: a polyurethane spray foam ("SPF") raw material supply; a fluid handling system; an air source; a heated hose; a whip hose; and a metal spray gun. The SPF raw material supply can comprise each of: an isocyanate-containing part A material stored in a first unpressurized container; and a polyol-containing part B material stored in a second unpressurized container; wherein either or both of the part A or part B materials incorporate an amount of particles. The fluid handling system can comprise a controller configured for execution of instructions; a part A material conduit having each of a part A material stream entrance and a part A conduit exit; a part B material conduit having each of a part B material stream entrance and a part B conduit exit; at least one pump configured to convey the SPF raw material supply from the first and second unpressurized containers in separate part A and part B material streams into and through each of the part A and part B material conduits, wherein operation of the at least one pump is managed by the controller; at least one heater configured to heat each of the part A and part B material streams, wherein operation of the at least one heater is managed by the controller; a power source; and electrical communications capability. The air source can convey first and second air streams each having a flow rate defined by instructions associated with the fluid handling system.

The heated hose can have a proximal end, a distal end, and a length, wherein the heated hose can comprise an exterior covering; a heated hose part A material conduit defining a portion of a part A material stream path from a location adjacent to the fluid handling system part A conduit exit to and through the length of the heated hose, wherein the heated hose part A material conduit at the proximal end of the heated hose is configured for engagement with the fluid handling system at the part A conduit exit; a heated hose part B material conduit defining a portion of a part B material stream path from a location adjacent to the fluid handling system part B conduit exit to and through the length of the heated hose, wherein the heated hose part B material conduit at the proximal end of the heated hose is configured for engagement with the fluid handling system at the part B conduit exit; heated hose first and second air stream conduits, wherein a proximal end of each of the heated hose first and second air stream conduits is configured for engagement with first and second air conduits of the air source at the proximal end of the heated hose; heated hose wiring configured to provide electrical communication between the fluid handling system and the heated hose, wherein a proximal end of the heated hose wiring is configured for engagement with fluid handling system wiring at the proximal end of the heated hose; andone or more heating elements configured to substantially maintain a target temperature of each of the part A and part B material streams when each of the part A and part B material streams are flowing in their respective heated hose part A and part B material conduits along the length of the heated hose.

The whip hose can have a length, a proximal end and a distal end, wherein the whip hose can comprise a whip hose part A material conduit defining a portion of the part A material stream path from a location adjacent to the distal end of the heated hose, wherein the whip hose part A material conduit at the proximal end of the whip hose is configured for engagement with the heated hose at the distal end of the heated hose; a whip hose part B material conduit defining a portion of the part B material stream path from a location adjacent to the distal end of the heated hose, wherein the whip hose part B material conduit at the proximal end of the whip hose is configured for engagement with the heated hose at the distal end of the heated hose; whip hose first and second air stream conduits, wherein each of the whip hose first and second air stream conduits at the proximal end of the whip hose is configured for engagement with each of the heated hose first and second air source conduits at the distal end of the heated hose; and whip hose wiring configured to provide electrical communication between the heated hose and the whip hose, wherein a proximal end of the whip hose wiring is configured for engagement with the heated hose wiring at the proximal end of the whip hose.

The metal spray gun can be configured with each of an assembly comprising a forward manifold, a materials entry part, and a rear part; a trigger; and a handle. The materials entry part can comprise each of a part A material entry port and a part B material entry port configured for engagement with each of the distal end of the whip hose part A and part B material conduits, wherein each of the part A and part B material entry ports are in communication with each of part A and part B material flow paths defined by respective through-between openings in each of the materials entry part and the forward manifold. The assembly can include each of part A and part B air inputs in fluid communication with the respective part A and part B material flow paths, wherein each of the part A and part B air inputs are located forward of each of the respective part A and part B material entry ports. The forward manifold can comprise a front side protuberance configured to communicate each of the part A and part B materials out of the assembly as separate material streams when the part A and part B material streams are conveyed from the SPF raw material supply to the spray gun. The assembly and rear part can be engaged with valving configured to start and stop the part A and part B material stream flow.

The method comprises generating, by the system, each of the part A and part B material streams, either or both of which comprise particles; conveying, by the system, each of the part A and part B material streams through the system and into a disposable mixing nozzle engaged with the front side protuberance; and applying, via the disposable mixing nozzle, a mixture of the part A and part B material streams to a surface or into a mold at a pressure of 250 psi or less. In one or more aspects, the particles included in either or both of the part A and part B material streams can comprise a fire-retardant/resistant intumescent material. An interior of the disposable mixing nozzle can include a static mixing element, and the mixing element can be approximately as long as an interior length of the disposable mixing nozzle. An interior of the disposable mixing nozzle can include a static mixing element; the mixing element can have a length shorter than an interior length of the disposable mixing nozzle; and a distal end of the static mixing element can be positioned proximal to a SPF mixture dispensing end of the nozzle. The mixture can be dispensed onto the surface from the disposable mixing nozzle at a volume of up to about 30 pounds per minute. A low global warming potential liquid blowing agent can be incorporated into the part B material.

In various aspects, the spray gun can comprise water flush capability provided by a water stream communicated via a water conduit from the fluid handling system through a water conduit in each of the heated hose and the whip hose into a water input port configured in line with the part B material flow path in the assembly. The instructions can be fully or partially provided by the computer, and wherein the instructions are either or both of: stored in memory associated with the fluid handling system; or provided by a mobile device associated with a technician located proximate to the fluid handling system. A plurality of sensors can be configured to collect information about operation of the system during a current polyurethane spray foam application event, wherein when operational in the current polyurethane spray foam application event the collected information is configured for use in the current polyurethane spray foam application event or is stored for use in a subsequent polyurethane spray foam application event. The fluid handling system can be configured with a mechanically linked pump, thereby providing substantially accurate metering of the part A and part B materials into and through each of the heated hose, the whip hose, and the spray gun. The system can be incorporated in a mobile trailer, thereby providing a polyurethane spray foam application method deliverable at a plurality of locations. The fluid handling system can be configured to generate a maximum pressure rating of about 500 psi. The particles can be incorporated in each of the part A and part B unpressurized containers. An agitator system can be engaged with each of the part A and part B unpressurized containers and wherein the agitator can be configured to provide mixing of the part A and part B materials prior to delivery of each into the respective part A and part B materials conduits.

In another aspect, a polyurethane spray foam coating can be generated from the method. The coating can be applied on a surface at a thickness of from about 0.5 inches to about 12 inches. The particles can be dispersed substantially uniformly throughout the thickness of the coating. The particles can comprise an intumescent material. The polyurethane spray foam coating can have a Class A flame spread rating of less than about 25 as defined by one or more of ASTM-E-84-22, UL-723 (2018) or NFPA 255 (2006). The polyurethane spray foam coating can have the Class A flame spread rating without application of a fire-resistant top coating or drywall to an exposed surface of the coating. The particles can comprise a material configured to impart conductive properties to the coating when applied to a pipeline configured for delivery of an electrical current along a length thereof.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

Figure 1:
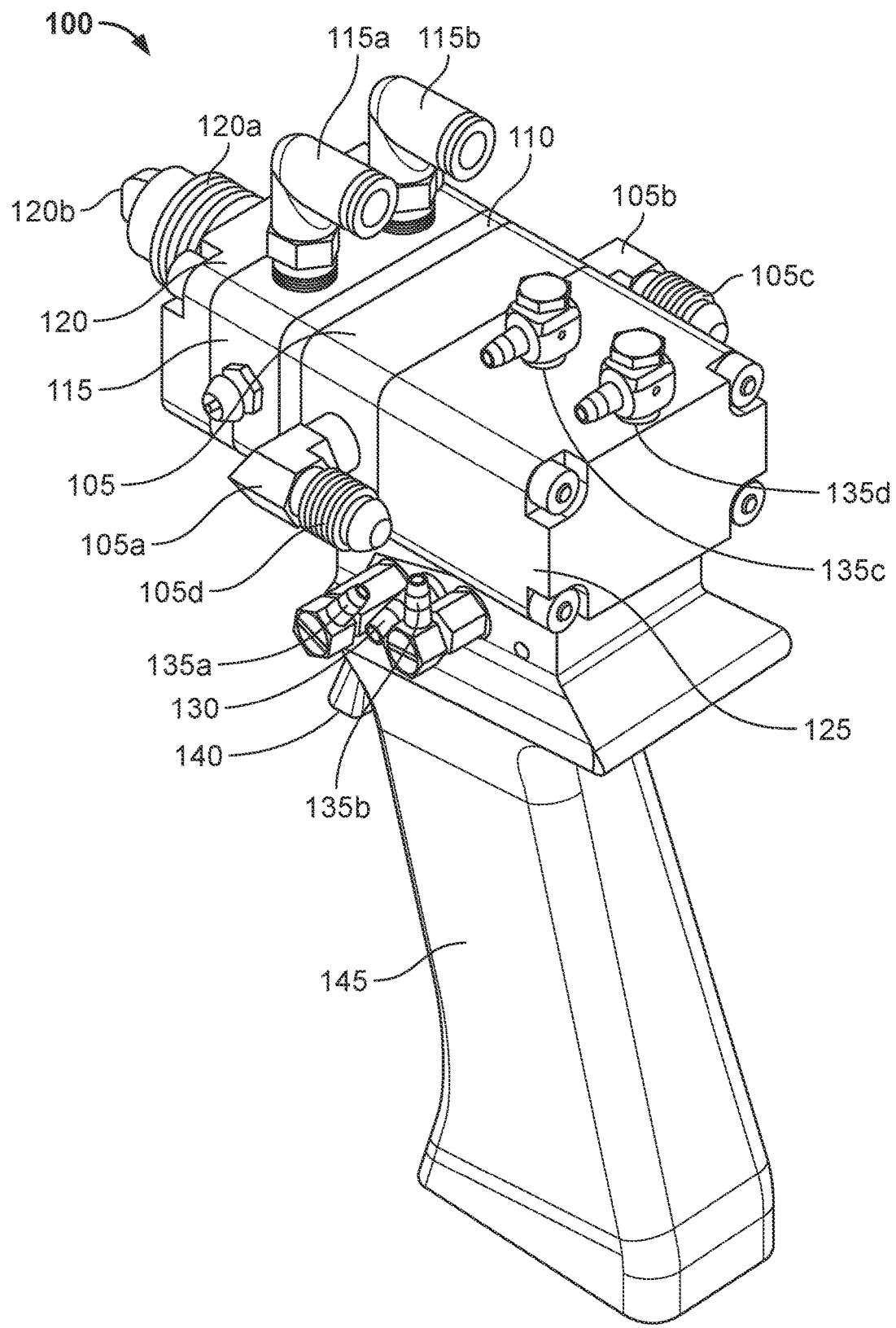
FIG. 1 illustrates an example of a spray gun, in accordance with various embodiments of the present disclosure.

Additional advantages of the invention will be set forth in part in the description that follows, and in part will be apparent from the description, or may be learned by practice of the invention. The advantages of the invention will be realized and attained by means of the elements and combination particularly pointed out in the appended claims. It is to be understood that both the foregoing general description and the following detailed description are exemplary and explanatory only and are not restrictive of the invention, as claimed.

DETAILED DESCRIPTION OF THE DISCLOSURE

In the following detailed description, reference is made to the accompanying drawings, which form a part hereof, and within which are shown by way of illustration certain embodiments by which the subject matter of this disclosure may be practiced. It is to be understood that other embodiments may be utilized, and structural changes may be made without departing from the scope of the disclosure. In other words, illustrative embodiments and aspects are described below. But it will of course be appreciated that in the development of any such actual embodiment, numerous implementation-specific decisions must be made to achieve the developers' specific goals, such as compliance with system-related and business-related constraints, which may vary from one implementation to another. Moreover, it will be appreciated that such development effort may be complex and time consuming but would nevertheless be a routine undertaking for those of ordinary skill in the art having the benefit of this disclosure.

Unless defined otherwise, all technical and scientific terms used herein have the same meaning as is commonly understood by one of ordinary skill in the art to which this disclosure belongs. In the event that there is a plurality of definitions for a term herein, those in this section prevail unless stated otherwise.

Wherever the phrases "for example," "such as," "including" and the like are used herein, the phrase "and without limitation" is understood to follow unless explicitly stated otherwise.

The terms "comprising" and "including" and "involving" (and similarly "comprises" and "includes" and "involves") are used interchangeably and mean the same thing. Specifically, each of the terms is defined consistent with the common patent law definition of "comprising" and is therefore interpreted to be an open term meaning "at least the following" and is also interpreted not to exclude additional features, limitations, aspects, etc.

The term "about" is meant to account for variations due to experimental error. AH measurements or numbers are implicitly understood to be modified by the word about, even if the measurement or number is not explicitly modified by the word about.

The term "substantially" (or alternatively "effectively") is meant to permit deviations from the descriptive term that do not negatively impact the intended purpose. Descriptive terms are implicitly understood to be modified by the word substantially, even if the term is not explicitly modified by the word "substantially,"

As used herein, a "high pressure SPF ('SPF) system" is a SPF application whereby an isocyanate-containing material (as "part A") and a polyol-containing material (as "part B") are provided to a metal spray gun for impingement mixing in a mixing chamber. Mixed foam is delivered from the spray gun end at pressures greater than 250 pounds per square inch ("psi"). As discussed herein, parts A and B materials are typically delivered from unpressurized 55-gallon drums or larger about 250 gallon "totes." The amounts of parts A and B materials for each application, and the pressures and temperatures associated therewith, are generally provided by fluid handling systems (e.g., high pressure proportioners) that comprise pumps, metering systems, and heaters. Air sources are also associated with these systems to deliver the air needed for pneumatic operation of the spray gun, as well as to deliver air to the gun for air purge needed to keep the spray guns clean in some spray gun configurations. Delivery of the pressurized and heated parts A and B materials in these systems are via heated hoses engaged to the metal spray gun, typically using a whip hose extension that facilitates movement of the spray gun in use. Upon combination of the pressurized and heated parts A and B materials streams in a spray gun mixing chamber at high velocity, the materials are mixed via impingement. Traditionally, high pressure SPF methods are used to insulate large surface areas in new or existing construction, as well as for some industrial applications. While any pressure exiting the gun greater than 250 psi is considered to be "high pressure," in use, high pressure systems typically dispense mixed parts A and B materials from the spray gun at pressures exceeding 1,000 psi. Volume output of the uncured spray foam for surface application at full trigger can be up to 30 lbs. per minute, such as when used for SPF coatings etc. These systems typically dispense the mixed parts A and B materials at from 120-150° F. (49-65° C.) which increases the propensity of the materials to be airborne in the environment for an extended period of time. As would be appreciated, the high pressures used require metal spray guns that can have more than 80 serviceable parts. Moreover, these metal spray guns often require frequent disassembly to remove clogs and blockages, which are a natural consequence of the use of reactive materials. Cleaning of the spray guns often requires use of volatile organic chemicals (e.g., toluene methyl ethyl ketone, etc.) which are known carcinogens.

As used herein, a "low pressure SPF system" is a SPF application whereby an isocyanate-containing material (as "part A") and a polyol-containing material (as "part B") are provided to a spray gun for delivery from a disposable static mixing nozzle at a pressure of less than 250 psi. To generate adequate mixing of the parts A and B materials in or proximate to the static nozzle engaged at the end of a spray gun, storage and delivery of the parts A and B materials is from pressurized containers. Instead of impingement mixing, parts A and B materials mixing is generated primarily by travel of the mixed, but uncured, parts A and B through the mixing nozzle.

Personal protective equipment ("PPE") is a safety requirement in all SPF applications. However, the type of PPE required by government regulation and by self-regulation by polyurethane industry organizations is largely dependent on whether workers in or around the jobsite on which the spray foam is being applied will be subjected to airborne chemicals, especially given the highly reactive nature of not-fully-cured polyurethane materials.

For high pressure SPF applications, the US Government Occupational Health and Safety Administration ("OSHA") requires, and the American Chemistry Council ("ACC") includes training related to use of, certain PPE for technicians and workers who are in the vicinity of locations on a jobsite while a SPF application is underway, and for some period after the application is completed—that is, while there is still a reasonable possibility that sprayed chemicals may remain airborne or otherwise unreacted/uncured such that the technician may inhale or come into skin contact with such chemicals. Such high-pressure SPF PPE requirements include:

Lung protection: Full face mask with supplied aft hood and pre-filter; or full-face air mask suitable for organic vapor; or supplied air respirator;

Eye protection: Full face mask-type depends on whether a supplied air hood is used or not. If the latter, the air hood will provide the needed eye protection;

Skin protection: Full coverall with long sleeves (e.g., Tyvek, etc.). Hood needed if full head covering if not incorporated with an air supply. Foot coverings are also required, which can be provided via the coveralls or by separate foot coverings;

Hand protection: Chemically resistant gloves (e.g., nitrile); and

Ventilation: Mechanical air exchange and/or fans.

For low pressure SPF applications, different PPE is required by both OSHA and the ACC, which would be expected due to the lesser propensity for airborne and uncured chemicals to be present in a location during and after an application event. While some contractors and/or technicians may elect to wear additional PPE, the low-pressure SPF PPE requirements include:

Lung protection: An aft mask suitable for organic vapor;

Eye protection: Safety glasses or safety googles;

Skin protection: Long sleeves. Hood needed if full head covering not incorporated with air supply. Foot coverings are also required, which can be provided via the coveralls or by separate foot coverings;

Hand protection: Chemically resistant gloves (e.g., nitrile); and

Ventilation: Mechanical air exchange and/or fans.

"Reentry time" is the time elapsed after completion of a SPF insulation event when it is deemed safe for workers to enter a building or a jobsite that has been treated with a SPF application so that the workers can resume work activities without the need for PPE. Reentry time for jobsites in which high pressure SPF has been applied is at least 24 hours. For low pressure SPF applications, including those of the present disclosure, reentry time is about 2 hours or less. "Re-occupancy time" is the time that people can stay in the location without PPE, such as residents in a house that was treated. Re-occupancy time depends on curing time for a SPF application, which can vary depending on a number of factors, such as foam type, temperature, and humidity. Per the US Environmental Protection Agency ("EPA") and manufacturer estimates, re-occupancy time for two-component high-pressure SPF applications is at least 24 hours and can be as long as 72 hours. For low-pressure SPF applications, re-occupancy can take place after approximately 8 to 24 hours.

In significant implementations, the systems and methods according to the present disclosure provide low-pressure application—that is, less than 250 psi—of SPF comprising a mixture of part A and B material streams delivered from the end of a disposable mixing nozzle engaged with an end location on a metal spray gun, where each of the A and B part materials are stored in and delivered to the system from unpressurized containers. In operation, a fluid handling system, often termed a "proportioner," is configured to communicate each of the part A (isocyanate) and the part B (polyol, surfactant, blowing agent, etc.) material supplies from their respective unpressurized containers to the metal spray gun for dispensing in a particular use case. The fluid handling system comprises or is in line with one or more pumps configured to convey each of the materials from their respective unpressurized storage containers in a metered or measured amount as defined by instructions associated with a SPF application event. Beneficially, the pumps can be mechanically linked to improve materials delivery in the intended amounts. The instructions can be associated with the fluid handling equipment by way of storage of information in memory associated with the equipment and/or by uploading of instructions to the system via an app on a mobile device used by a technician onsite. Instructions can also be input by the technician for operation of the fluid handling equipment in a SPF application event.

The fluid handling system can further be configured, via instructions, to pre-heat and to meter each of parts A and B materials for delivery at a metal spray gun end in an amount defined by the SPF application instructions. The fluid handling system can further be configured to independently communicate each of the heated parts A and B material streams though a length of one or more heated hoses configured with individual materials flow paths/conduits, air line(s), water line(s), wiring, and other elements that are relevant to operation of the system in a particular use case (e.g., sensors, electrical connections, etc.) to the disclosed metal spray gun for delivery of a mixed, uncured SPF foam through an interior of and from an end of a disposable mixing nozzle engaged with the gun. A whip hose can be engaged between the heated hose length and the metal spray gun to facilitate operation of the spray gun by a technician in a SPF application event.

When the low pressure method and associated spray gun configuration disclosed in the '253 patent was put to commercial use, it was found that the volume of SPF dispensed from that improved spray gun per minute was too low for many applications. Moreover, it was found that, while the air stream reduced clogging of the spray gun in use (as discussed in the '776 Publication for example), clogging still might occur, thus requiring replacement of the spray guns, which were made primarily from plastic components and intended to be disposable. In order to solve those previously unrecognized challenges, the inventors found that it was necessary to develop a new spray gun design to the mixing of the parts A and B materials and to improve SPF flow rates from the spray gun, while still being able to employ non-pressurized parts A and B materials supply sources.

In this regard, a new metal spray gun configuration was developed by the inventors to meet the needs of users. In this regard, a metal spray gun design having two air input lines forward of the parts A and B materials input lines was developed for use in the disclosed systems and methods. The metal spray gun used herein is specially configured to allow higher volumes of spray foam to be dispensed per unit of time (e.g., pounds per minute) while still using a low pressure dispensing system, that is, less than 250 psi at the point of foam delivery from an end of the mixing nozzle. Unlike the disposable plastic spray guns of the '776 Publication and the '253 patent that included a single stream of air/fluid input in an internal mixing chamber where the parts A and B materials combine forward of entry of the mixed foam into a disposable mixing nozzle, the metal spray gun herein is configured to provide each of the parts A and B material streams with independent in-line air supplies from a location after input of the parts A and B materials into the respective material flow paths/conduits in the spray gun and prior to exit of each of the streams for combination in the mixing nozzle. Because low pressure is used to generate the flow of each of the materials streams in the respective flow paths/conduits in the metal gun to exit as individual materials streams in the mixing nozzle, there is no impingement, which is defined as mixing that occurs when two high velocity streams collide in a mixing chamber. Since the parts A and B materials combine only in the mixing nozzle, there is no mixing chamber in the metal spray gun of the present disclosure. Each of the parts A and B material streams are delivered from unpressurized sources and are configured by the fluid handling equipment provide a foam SPF delivery of less than 250 psi at the foam delivery location.

Notably, even though the parts A and B material streams flow rate (e.g., volume/minute) out of the mixing nozzle end is at a significantly higher rate than that from the plastic gun of the '253 patent, the SPF generated according to the disclosure herein does not necessitate reconfigurations of the formulations used in a SPF application. That is, a 1:1 isocyanate:polyol as parts A and B materials etc. can suitably be processed using the systems and methods herein. Without being bound by theory, the inventors understand that the enhanced flow provided by the addition of air independently to each of the parts A and B material streams forward of each of respective materials input locations in accordance with the present disclosure enables proper mixing of the SPF in a mixing nozzle engaged at an end of the metal spray gun. Prior to the inventors' work, it would be expected that suitable mixing of the parts A and B material streams delivered from unpressurized containers at low pressure in a mixing nozzle could not occur in the absence of conventional impingement mixing in a mixing chamber present in the gun after which the mixed foam would be dispensed from the gun end without use of a mixing nozzle. As would be appreciated, such impingement mixing is provided in prior art SPF systems via application of high pressures via a fluid handling system operational in the SPF application.

The inventors surprisingly found that the ability to increase parts A and B materials mixing quality via incorporation of air with each materials stream along with the use of a mixing nozzle engaged at the end of the spray gun can provide proper mixing so as to generate SPF that meets the specifications of SPF delivered from high pressure systems. Moreover, the present methodology increases SPF flow delivery from the system to enhance the usability of the systems and methods herein over the low pressure methodology disclosed in the '253 patent. The systems and methods herein can therefore provide suitable substitution for processes that utilize high pressure SPF dispensing, even while the safety profile of an SPF so dispensed can be markedly improved due at least to the use of low pressure to generate the SPF.

Without being bound by theory, the inventors herein believe that the enhanced mixing of parts A and B seen with addition of air in each of the material streams may be associated with improvement in the air nucleation when the parts A and B materials meet at an exit location at the end of a forward manifold where a mixing nozzle is engaged in use. It was previously not understood that the necessary air nucleation to effect the parts A and B materials reaction could be generated when these materials are supplied from non-pressurized containers where the pressure at materials delivery below 250 psi. The inventors currently understand that when each of the parts A and B material streams are individually augmented with aft streams added downstream of the respective materials entry locations into the fluid paths or conduits, the flow rate/flow force/velocity at which the respective material streams can combine in the mixing nozzles and under which the mixture will travel as foam in therein can generate a more efficient mixing operation that is comparable or even equivalent to the mixing quality generated from high velocity mixing of the parts A and B material streams in an impingement mixing operation occurring in a high pressure system.

At a minimum, the degree of mixing provided by the disclosure herein generates an adequate mixing operation for the SPF applications as contemplated herein. Thus, it might be hypothesized that the systems and methods herein represent a heretofore unrealized type of mixing operation that can operate as a new category of SPF mixing that could be recognized as a suitable substitute for high velocity impingement mixing that is the status quo today for high volume SPF applications. The SPF system configurations of the present disclosure, and the use thereof as disclosed herein, therefore meet the definition of "low pressure systems," albeit under markedly different operating parameters as compared to the prior art. That is, low pressure SPF delivery is provided from parts A and B materials supply sources that are unpressurized, and the delivery volumes can be greater than 14 pounds per minute. Since low pressure delivery of the SPF at the delivery location is provided, technician safety can be expected to improve. Reentry times for a jobsite on which a SPF has been applied can also be equivalent to that of low pressure SPF applications, namely about 1 to 2 hours.

The low-pressure systems and methods of the present disclosure generate a pressure of mixed parts A and B materials from the point of spray gun exit of a SPF spray foam system—that is, the end—of a disposable mixing nozzle engaged with the spray gun of about 250 psi or less; about 240 psi or less; about 230 psi or less; about 220 psi or less: about 210 psi or less; or about 200 psi or less. In some implementations, a foam dispensing pressure at a delivery end of the nozzle can be from about 100 psi to 200 psi, or from about 125 psi to 175 psi. While the delivery pressure of the SPF at a point of dispensing from the end of the mixing nozzle can vary, it should be apparent that the delivery pressure according to the systems and methods herein are significantly less than that from high pressure SPF systems.

In separate significant implementations, the volumes of SPF dispensed per minute from the spray guns onto structural surfaces (e.g., for insulation and related applications) having the characteristics described herein are greater than about 12, or 15, or 17, or 20, or 22, or 25, or 27 and up to about 30 pounds per minute, where any value can form an upper or lower endpoint, as desired. Yet further, and as discussed hereinafter, larger volumes of SPF, such as up to 80 or 100 pounds per minute, can be generated which can be useful for mold filling operations as discussed elsewhere herein.

Referring now to FIG. 1, an exemplary spray gun 100 for use in the present disclosure is described. Spray gun 100 will be described in relation to the components that provide one or more functional aspects in the gun as exhibited in the operation of the systems and methods of the present disclosure. As would be apparent from the described features of spray gun 100, the gun is constructed from metal parts that are machined to enable the gun to be assembled and disassembled by a technician for servicing or repair as needed. Parts used in the metal spray guns herein can be replaced on an as-needed basis. Parts can also be refurbished.

Spray gun 100 comprises a housing part 105 having part A and part B materials input ports 105a and 105b. As would be appreciated, the materials input ports 105a and 105b are engageable at threaded engagements 105c and 105d to provide fluid engagement with each of parts A and B fluid paths/conduits in housing part 105. Respective parts A and B materials fluid paths/conduits are defined by through-between openings (not shown) that are configured in parts 105, 110, 115, and 120 when these parts are assembled for use. Exemplary configurations of these and other parts A and B materials and air flow inputs and fluid paths/conduits are discussed hereinafter.

Part 110 is configured forward of part 105 and, when spray gun 100 is assembled, part 110 sits between parts 105 and 115. Part 115 comprises air inputs 115a and 115b. Each of 115a and 115b are in respective communication with each material stream fluid paths/conduits (not shown) defined by through-between openings configured in 115 that are in line with through-between openings (not shown) in parts 105 and 110. In other configurations, parts 105 and 115 can be adjacent to each other when the gun is assembled (i.e., part 110 is omitted), or additional spacers (not shown) can also be arranged between 105 and 115 (i.e., a plurality of spacers can be included). As shown, air inputs 115a and 115b are shown in part 115, but other configurations for 115a and 115b are possible, such as in a single part where the air inputs are forward of the respective parts A and B material steam inputs. While 115a and 115b are shown at the top of 115, it is to be understood that other locations for 115a and 115b can be contemplated, such as below 115, on the side of 115, etc. In some implementations more than one air input can be provided for each of the parts A and B materials streams as long as the configuration of multiple air inputs are forward of the location where the materials enter the fluid path/conduit for each material. The inventors believe that as long as each of the air inputs are downstream of the respective materials input locations in the spray gun and sufficiently upstream of the stream exit locations at forward manifold 120b, suitable mixing behavior in the mixing nozzle needed to obtain the benefits of the systems and methods herein can be generated.

Conventionally, fluid handling systems are configured with compressed air for use in, for example, powering pneumatic triggers and to provide cleaning of the spray gun. In the present disclosure, a single air compressor can be configured with a bleed valve as one or more additional lines configured in a heated hose length to provide an air pressure to each of the inlets 115a and 115b of from about 100 to about 170 psi or from about 120 psi to about 150 psi for a SPF application. The amount of air flow provided to each of 115a and 115b can be varied in relation to the flow rate applied to each of the respective materials streams, with higher materials flow rates benefiting from higher air flow rates at the input.

As would be appreciated, the amount of air flow applied could affect the movement of each of the respective parts A and B material streams through spray gun 100, as well as the behavior of the SPF in and out of the mixing nozzle. Accordingly, a technician can evaluate the characteristics of a generated SPF during application to ensure that the air pressure from the air compressor into each of the spray gun air input locations generates a SPF is within an appropriate range for a specific application, and, if appropriate, the amount of air supplied in either of the rearward or forward locations can be adjusted. Such adjustments can be recorded for subsequent use by the fluid handling equipment or by the technician. In further implementations, a sensor can be engaged with the air line, such as in the whip hose area (as discussed elsewhere herein) that is in line with the parts A and B material streams in the spray gun, whereby that pressure can be monitored during an application process, as well as being recorded for reporting and subsequent management of SPF processes.

Figure 3:
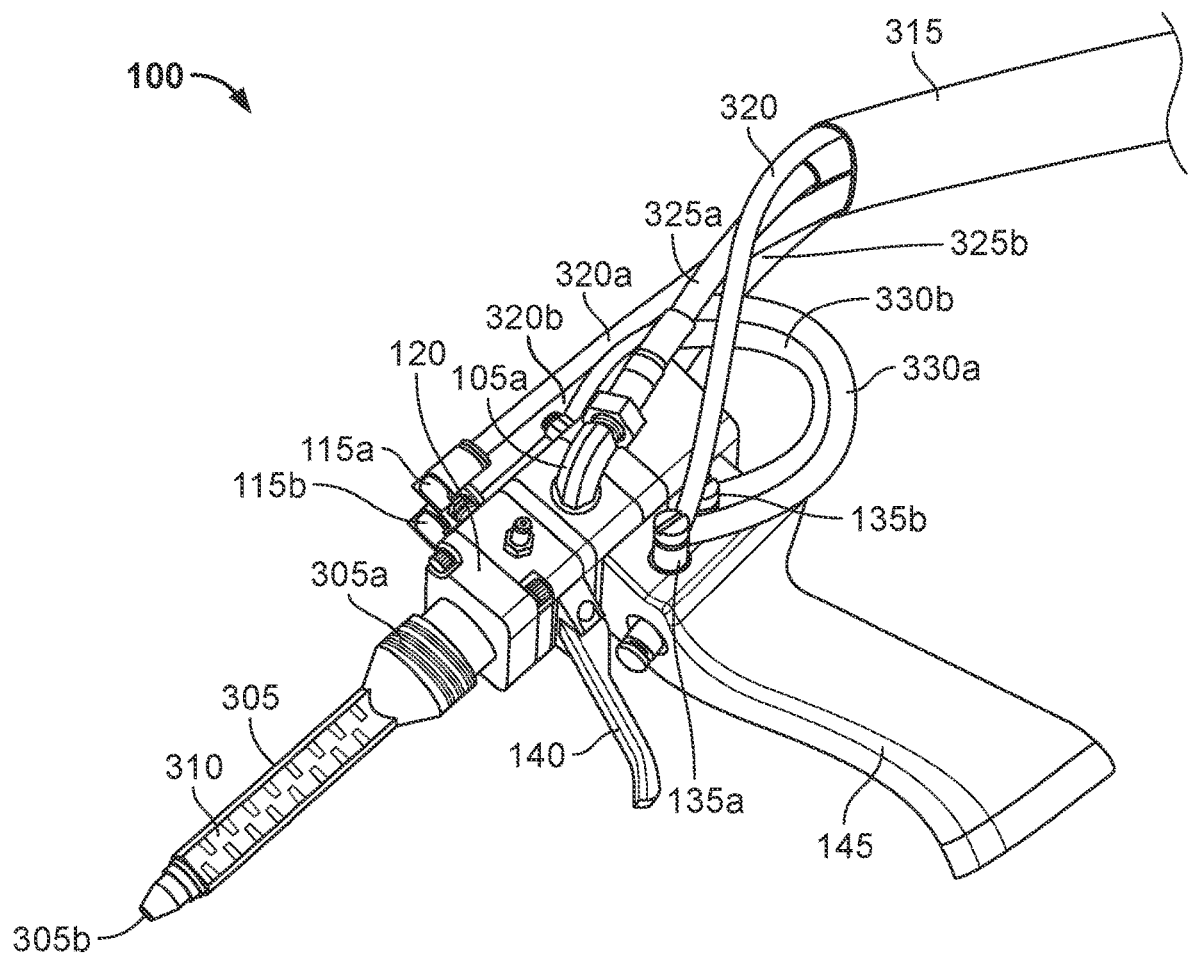
FIG. 3 illustrates an example of connections for the spray gun of FIG. 1, in accordance with various embodiments of the present disclosure.

Referring again to FIG. 1, forward to part 115 is forward manifold 120 that is, as shown, configured with threaded area 120a for engagement with a disposable mixing nozzle (as shown in FIG. 3). As would be appreciated, each of the parts A and B material streams will individually be dispensed out of 120b to begin a mixing operation that progresses along a length of the nozzle as the mixed parts A and B materials travel therein. In use, engagement of a disposable mixing nozzle end with threaded area 120a creates a location (as shown in FIG. 3) where the parts A and B materials streams initially combine. The parts A and B materials exit into a disposable mixing nozzle (as shown in FIG. 3) as individual materials streams at protuberance 120b at an end of forward manifold 120.

Flow from each of the parts A and B materials streams from material input ports 105a and 105b is generated by a user action of the spray gun trigger that by flow urges each material stream through the respective fluid paths/conduits into the disposable mixing nozzle to generate the SPF mixture that will then travel the length of the mixing nozzle for delivery from an end thereof. As noted, the materials flow and mixing operation is believed to be facilitated by air flow as augmented by air inputs forward of the material input locations at 115a and 115b.

Figure 2:
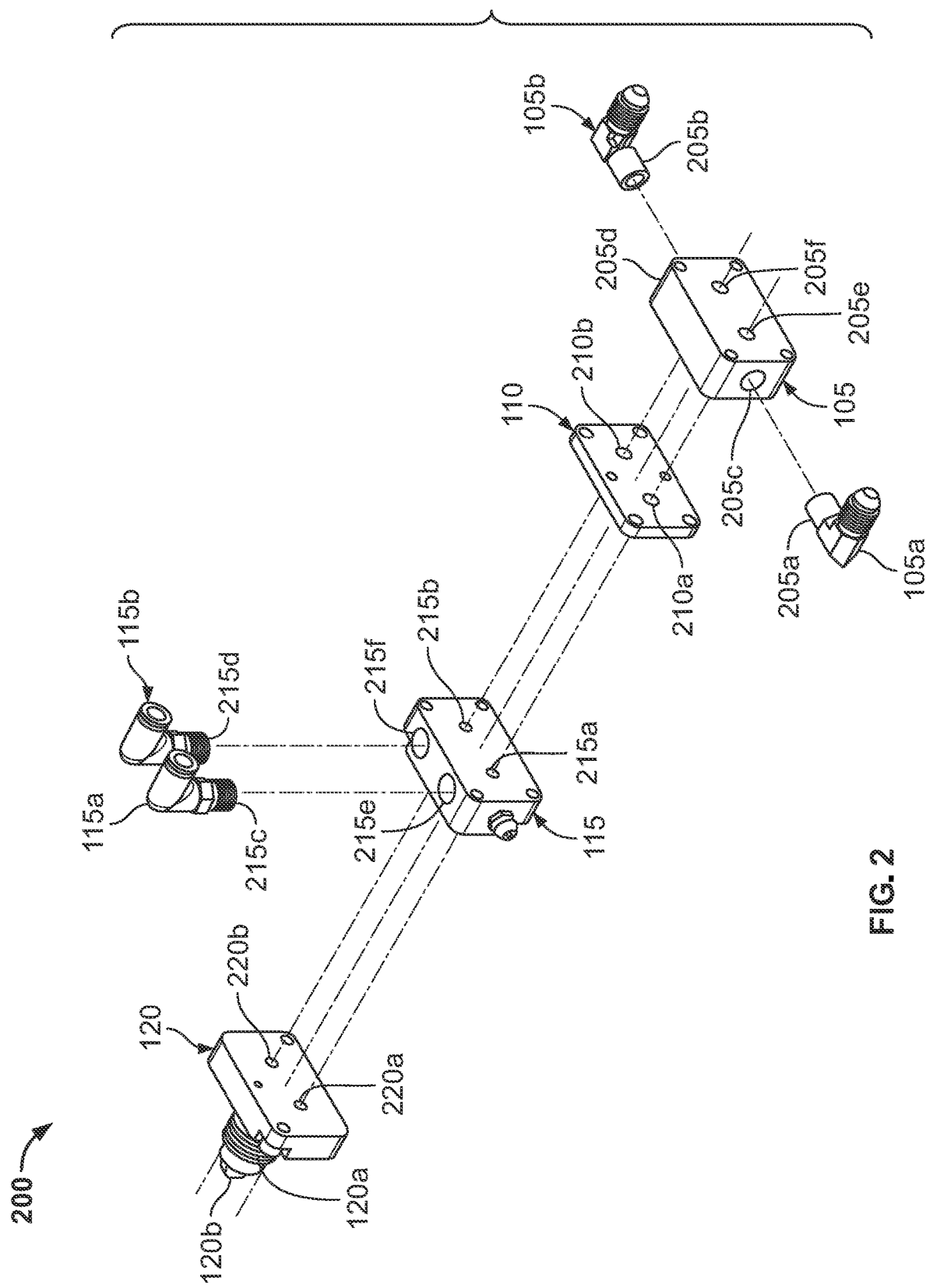
FIG. 2 illustrates an example of an assembly of the spray gun of FIG. 1, in accordance with various embodiments of the present disclosure.

Referring to FIG. 2, exploded parts configuration 200 shows parts 105, 110, 115, and 120 of spray gun 100. Part A and part B materials input elbows 105a and 105b are shown with threaded ends 205a and 205b, each of which are respectively engageable with part 105 engagement ports 205c and 205d. Part 105 comprises through-between openings 205e and 205f, which extend to a front side of 105 (not shown). Part 110 comprises through-between openings 210a and 210b that, when spray gun 100 is assembled for use, will be aligned with each of 205e and 205f. Part 115 includes through-between openings 215a and 215b that when spray gun 100 is assembled for use, will be in alignment with each of 210a and 210b, respectively. Air inputs 115a and 115b are shown with threaded ends 215c and 215d that are respectively engageable with 215e and 215f of part 115. Part 120 is shown with through-between openings 220a and 220b that will be in alignment with each of the other through-between openings 215a and 215b. As would be appreciated, air will flow through each of materials fluid paths/conduits that are formed from the alignment of the through-between openings of the assembled spray gun parts when the fluid handling system is operational to send air through the heated hose and whip hose arrangements into each of the air inputs 115a and 115b. When trigger 140 (FIG. 1) is engaged by a user, parts A and B materials streams will be respectively communicated through each of 105a and 105b to meet with air inputs at 115a and 115b. As discussed, each of the parts A and B material streams will be communicated out of part 120 at end 120b into a disposable mixing nozzle (as shown in FIG. 3) engaged with threaded end 120a.

The air supply provided to each of 105a and 105b can be monitored using a plurality of sensors engaged with an air supply source associated with fluid handling equipment, such as by incorporating sensor capability proximate to a point of engagement of a first air stream (not shown) and a second air stream (not shown) at a whip hose terminal end and spray gun proximate end where each of the air streams connects therewith. Such sensor can be in communications engagement with the fluid handling system or another computer (e.g., a mobile device configured for communication with the fluid handling system or associated equipment), for use of any acquired information as discussed elsewhere herein.

As would be appreciated, an air dryer can also be in fluid engagement with an air source that is used in the spray gun with the parts A and B, that is, referring to FIG. 1, a dried air source is used at inputs 115a and 115b. Yet further, the system can be configured to sense and output to a user in real time on-system parameters such as the moisture content of the air and the air pressure inside the line. For example, a mobile rig communications system can be configured to send real time system information to a cell phone, a tablet, or other mobile device via an app. The acquired data can also be provided as a data stream that is sent to the cloud for analysis and storage. Such data can then be useful to generate maintenance reports and quality checks.

Referring again to FIG. 1, rearward of 105 is part 125 in which air input 130 is incorporated. Mien the fluid handling system is operational, air will be communicated from the air source via an air conduit as is conventional. Shown in FIG. 1 is a pneumatically operated spray gun having pneumatic inputs operational as 135a, 135b, 135c, 135d shown with 130. Parts A and B material flow will commence upon a technician's activation of trigger 140 while holding handle 145 operation of these pneumatics on via mechanical valving (not shown) configured on the interior of housing 125, as would be understood. The valving is operational to open and close the material inputs 105a and 105b in response to user activation of trigger 140. In this regard, trigger 140 is responsive to user action for an intended operational parameter of the spray gun in the context of a SPF application event. Such intended operational parameter can include stopping, slowing, or speeding up of the flow of part A and part B material streams as delivered from the parts A and B material input ports 105a and 105b.

Control of air input into the materials flow paths at 115a and 115b are beneficially continuous while a spray gun is operational in a SPF application event, that is, continuous air flow can be provided into and through the materials fluid paths/conduits on interior of spray gun 100 even when parts A and B materials are not flowing therein. As would be appreciated, such continuous air flow in and through the spray gun in use even while parts A and B materials are not flowing through and out of the spray gun can markedly reduce the propensity of the spray gun and an engaged mixing nozzle from clogging in an application event. The air flow into the rear of spray gun 100 at 135c and 135d and/or into the parts A and B materials streams at 115a and 115b can be managed by the fluid handling system in some implementations. The flow of air to rear portions of spray gun 100 can be at from about 70 to about 100 psi, or at any other value suitable for operation of the valving and the other components associated with housing 125. In other implementations, air flow to 115a and 115b and to housing 125 can be managed by a user via opening and closing of valves associated with first and second air streams.

As discussed hereinafter, in some implementations, an electronic trigger can be appropriate for some types of uses, especially when precision SPF application is appropriate in a particular use case.

Spray gun 100, in particular, the parts that are configured for assembly and disassembly can be fabricated out of aluminum. Use of this material can provide the necessary durability for a re-useable spray gun configuration, as well as being of a lightweight suitable for hand-held operation. As appropriate, other parts of the spray guns, such as O-rings, gaskets, screws, etc. can be configured from materials that are suitable in the context of the specific functionality needed for that part.

As would be appreciated, static mixing nozzles can be used to facilitate mixing of the materials. In this regard, the parts A and B materials enter the static mixer from their respective materials paths/streams from forward manifold exit 120b where they run through a series of chambers called "elements" that mix the two parts and facilitate activation of the curing process. Static mixers are tubular components configured with internal elements that produce desired mixing and dispersion effects as a mixture of parts A and B materials streams through and around motionless mixer parts generated by the internal elements. The fluid flow that provides the mixing is provided by the forward motion of each of the parts A and B materials streams out of the spray gun forward manifold exit. The size and configurations of a suitable mixing nozzle can depend on various factors, such as the type of application, parts A and B materials ratios, need for precision application, tolerance of clogging/fowling of the nozzle, among other things. The most common internal mixing elements includes the helical and the box chamber types. Disposable static mixers are designed to be thrown away after use which can be cost effective compared to the flushing and cleaning necessary in non-disposable mixers. They are also indicated for equipment which will handle multiple adhesive types.

While forward manifold end 120b in FIG. 1 is shown with a threaded protuberance, other types of connections can be used. For example, a snap-fit engagement or other configuration can be suitable as long as such connection generates a fit between the nozzle and the manifold end that will allow the nozzle end to be engaged during an application event and to be easily switched out when the nozzle needs to be changed or removed.

Referring to FIG. 3, spray gun 100 is shown with disposable static mixing nozzle 305 engaged with spray gun end part 120 at nozzle engagement 305a. Spiral static mixing element 310 is incorporated on an interior of nozzle 305. In use, the SPF is dispensed out of nozzle end 305b. A wide variety of nozzles can be used for in the systems and methods herein including, but not limited to, those made by Nordson EFD, including disposable Spiral Mixer™ (but not limited to) series 120, series 162A, series 160 spiral bell mixers, series 190 mixers, series 260 mixers, or series 480 OptiMixer™. Other suitable mixers include helical mixers such as those described in U.S. Pat. No. 5,529,245 and the like. Such nozzles can contain helical static mixers to assist in efficient and effectively mixing of the plural components of systems as described herein.

In other implementations, the disclosure provides novel static mixing nozzle configurations. The inventors have determined that suitable mixing can be provided for the parts A and B materials streams using a static mixing nozzle in which a mixing element does not substantially fill an interior of the nozzle. In this regard, the inventors have found that it is possible to reduce the size of an internal static mixing element as compared to that of prior art mixing nozzles, for example to about ⅔, or about ½ or about ⅓ of a total interior length of the nozzle. A helical static mixing element can suitably be utilized in a shorter length in accordance with this implementation. This shorter length for the static mixing element in the nozzle has surprisingly been found to create a suitable foam mix for application out of the end of the nozzle.

In a suitable implementation, the portion of the static mixing element can be arranged with a distal end proximate to an interior end of the nozzle such that a proximal end of the static mixing element (from the point of reference of the engagement location of the nozzle end with the manifold) is not occupied by the static mixing element. Put another way, a length of a static mixing element can be positioned at a front interior end of the mixing nozzle to leave the interior nozzle area closest to the manifold unoccupied by the mixing element. It has been found that not only can generate effective mixing of the parts A and B materials streams be provided using this novel mixing nozzle configuration with the system and methods herein, clogging of the disposable static mixing nozzle can be reduced substantially as compared to use of a mixing nozzle having a static mixing element that substantially fills an interior of the mixing nozzle.

The length of the static mixing nozzle can vary in accordance with the specific use case. A longer mixing nozzle can be useful when filling a mold, especially when a timed shot process is being used. Mold filling can be facilitated when the nozzle end can be placed in location in the mold. Instructions associated with the systems can be configured to suggest a static mixing nozzle size, type, mixer configuration suitable for a specific application and/or SPF application event. In non-limiting examples, an interior portion for the mixing nozzle can be about 6 inches in total length (i.e., from the location where the parts A and B enter the nozzle from their respective materials streams at the manifold to the nozzle exit) and the static mixing element positioned on an interior of the nozzle can be about 2 inches, 3 inches or 4 inches long. In another non-limiting example, an interior portion of the nozzle can be about 12 inches long, and the static mixing element positioned on an interior of the nozzle can be about 4 inches, 6 inches, or 8 inches. It can further be expected that other lengths and proportions of a static mixing element can be suitable. Such nozzle lengths, static mixing element combinations, and static mixing element configurations can be determined for a use case by a person of ordinary skill in the art without undue experimentation.

Yet further, it has surprisingly been determined by the inventors herein that, in some implementations, suitable mixing can be provided of the parts A and B materials streams using a mixing nozzle that does not contain a static mixing element. Without being bound by theory, it is believed that that the enhanced mixing behavior provided from the application of air streams in line of each of the parts A and B materials streams at a forward location thereof can generate sufficient mixing as needed for some SPF application use cases even with low pressures. The ability to use mixing nozzles that do not incorporate fully lengthwise static mixing elements can be expected, in some implementations, to reduce clogging behavior of the nozzles, as well as providing a more cost-effective application for some use cases.

As with use of conventional static mixing nozzle (i.e., those having static mixing elements spanning substantially an entire interior thereof), the shapes of the mixing elements, as well as the total length of the nozzle, as well as whether a mixing element is included in the nozzle in the first order will generally depend on the use case. In implementations, instructions associated with the operation of the fluid handling system in a SPF application event can direct a user to select one or more mixing nozzles appropriate for use in that event. Yet further, information associated with use of such spray nozzle in a particular SPF application event can be recorded for use in providing instructions associated with subsequent application events.

In some implementations, a water flush component can be incorporated in the gun. In this regard, a water line, which may be optionally include heating, can be included from a supply line that is incorporated in the heated hose as a conduit suitable for water. The whip hose can also include a water conduit, The spray gun can be configured with a water input port that allows the water to be input into the spray gun at the part B material input location, that is, at 115b. The water input can be removable or sealable. The spray gun and associated fluid handling system componentry can be configured to allow the water to be input into the spray gun on an as-needed basis to provide a flushing of the part B material flow path/conduit and an engaged mixing nozzle, as appropriate in a use case. For example, a valve can be operational to cut off the air flow and input water into the line to flush a mixing nozzle so as to allow a single mixing nozzle to remain unclogged for a longer period of time. A time shot mold filling process that uses a long static mixing nozzle can benefit from use of a water flush to extend the life of the nozzle by helping to maintain it in a substantially unclogged form during a SPF application event.

FIG. 3 also shows connections via whip-hose 315 having air line 320a for connection to inputs 115a for providing air to the part A material stream (not shown) when trigger 140 is activated by a technician. Air line 320b also leaves whip hose 315 to connect to part B air input 115b for incorporation of air into the part B material stream upon the same trigger activation. Part A supply line 225a is in connection with part A input 105a in spray gun 100. Although not visible in FIG. 3, part B supply line 325b is also individually engaged with 105b. FIG. 3 also shows air line 320 for connection to air input 130 (not visible) and pneumatic connector lines 330a and 330b.

As noted, the systems and methods of the present disclosure utilize unpressurized parts A and B material supply sources, and not the pressurized containers used for low pressure systems in the prior art that are useful primarily for small insulation jobs. As would be appreciated, use of larger supply volumes of parts A and B materials can be beneficial for commercial applications, such as for SPF contractors. The use of non-pressurized containers can also enhance the safety profile for storage as compared to low pressure systems that utilize pressurized containers, since commercial supplies of the containers need not be stored in temperature-controlled areas configured for explosion management. The ability to store the containers in a standard climate-regulated warehouse environment instead of an explosion-proof climate-controlled warehouse is a relevant benefit to the industry.

Still further, the different volumes of SPF can be provided using the low pressure systems delivered from unpressurized supply sources by varying one or more elements of the system and/or metal spray gun. In some aspects, the size of the parts A and B materials input lines 105a and 105b can be made larger, such as by increasing the size from about ¼ inch, to about ⅝ inch or to about ¾ inch. The increase in the parts A and B supply inputs 105a and 105b can be associated with an increase in the size of each of the through-between openings in parts 105, 110, 115, and 120 that, when spray gun 100 is in assembled form, form respective fluid paths/conduits for flow of the parts A and B materials for larger volume of SPF delivery out of the spray gun. Air inputs 105a and 105b can also be increased, in some implementations. However, the sizes of the through-between openings that form the material fluid paths/conduits and materials/air inputs should be maintained to an upper limit that does not cause material flow to be in too large a volume that negatively affects the mixing operation. Such upper limits can be determined by a person having ordinary skill in the art without undue experimentation.

The disclosure herein further comprises selection, by a user, of a desired SPF volume to be dispensed per unit of time. In response to such selection, the user can select and assemble a collection of metal spray gun parts suitable to provide the selected SPF delivery volume for a particular application event. The user can also be provided with instructions associated with selection of the appropriate spray gun configuration for use to generate the desired SPF dispensing volume. The user can also be provided with instructions for assembly of spray gun parts to provide the desired SPF dispensing volume. As discussed further herein, the other features of the systems and methods herein can also be associated with instructions relevant to user operation and desired outputs therefrom.

As would be understood, the types of each of the parts A and B materials useful in the systems and methods herein can be extensive and, unlike with current low-pressure systems, each of the types of the parts A and B can be individually selected by a SPF contractor based on factors such as, for example, desired SPF characteristics, supply chain availability, cost, etc. The ability to mix and match the various ingredients in a SPF application is a further advantage with the systems and methods herein. That is, instead of relying on an ingredient supply dictated by the suppliers who prefill pressurized containers for use in low pressure systems, SPF contractors can select from among a wide variety of parts A and B materials for use in their businesses. This means also that a SPF contractor can experiment between and among various products to generate a desired end result that might result in proprietary improvements in the products that they provide to their customers. Data from such experimentation, including differences in processing features, can be collected for later evaluation and process management, as discussed hereinafter. The parts A and B materials can be selected for use to provide the desired foam SPF properties in terms of density, cell size, R-value, etc.

The isocyanate-containing A side can comprise:
4,4' Methylene diphenyl diisocyanate, CAS #101-68-8
Polymeric MDI, CAS #9016-87-9
Generic MDI mixed isomers, CAS #26447-40-5
Fire-retardant/resistant particles
Other similar isocyanates Various manufacturers supply isocyanates for use in SPF applications such as, BASF (Lupranate®), Huntsman (Rubinate®), and Dow Chemical (Isonate®).

The polyol-containing B side can comprise:
Polyols (derived from petroleum and agricultural sources)
Fire-retardant/resistant particles
Blowing agents
Amine or metal catalysts
Surfactants
Other chemicals Generally, the polyol-containing B side materials can be formulated by a supplier to provide the desired properties in the SPF during application, as well as after cure. Although polyols differ in molecular weight and somewhat in chemical structure, all are generally very large alcohol-type molecules. Polyols typically make up at least 70% by weight of a polyol resin blend.

A wide variety of parts A and B material types and suppliers can suitably be used in the disclosed systems and methods, one type of part B polyol that can be used is HandiFoam® HVLP MD 2.0 HFO (Part No. P60018) and HandiFoam® HVLP MDW 2.0 HFO (Part No. P60017), both of which are products of ICP Building Products Group. Each of these materials can be supplied in 55-gallon drums, as well as larger totes or tanker cars. A notable aspect of each of these polyols is the incorporation therein of liquid blowing agents that have low global warming potential ("low GWP").

As would be appreciated, a blowing agent is a liquid component in the B-side that facilitates the reaction necessary to transform the parts A and B into a foam that would otherwise react to form a solid polyurethane. As a result, it is a critical component to SPFs. Blowing agents can work by either a chemical reaction or a physical phase change. Hydrofluoroolefins (HFO's) are a family of liquid blowing agents that, while originally used in refrigeration applications, have been identified as good replacements for hydrofluorocarbon blowing agents that create VOCs and, thus, contribute to global warming. The low boiling points of these liquid materials mean that when exposed to SPF application temperatures upon introduction into a mixing nozzle at the end of a spray gun, the liquid materials will expand to generate a physical blowing agent effect that causes foaming of the materials.

In two component low pressure SPF systems that are dispensed from pressurized containers, the blowing agent/propellant used is traditionally a gas. While low GWP liquid blowing agents have recently been finding use in high pressure dual component systems, it was not previously recognized that such blowing agents would be suitable for use in low pressure SPF applications delivered from unpressurized containers. That is, it was not expected that these newer blowing agents would provide suitable foaming as used in the systems herein. The ability to use low GWP liquid blowing agents included in the polyol-containing part B material while still generating good foaming is a notable improvement seen with the systems and methods herein.

Without being bound by theory, it is believed by the inventors herein that the additional fluid flow characteristics and mixing behavior generated from the input of air into the materials streams also is sufficient to provide energy for the activation of the low GWP blowing agents even when dispensed at low pressure according to the methodology herein when using low GWP liquid blowing agent. That is, it is understood that a high velocity impingement mixing operation, as is the case in a high pressure SPF system, is not needed to generate suitable foaming behavior from the low pressure systems and methods herein. This is a further benefit from the disclosure herein at least because existing part B materials incorporating low GWP blowing agents that are currently used in high pressure SPF applications can be used as-is in the systems and methods herein.

While today most SPF applications use petroleum-derived raw materials, there is increasing interest in use of bio-based materials. Many commercial types of polyols for use in SPF have been introduced for use, for example, products available today are derived from non-petroleum sources such as sugar cane, soy, castor oil, animal fats, lignin, and other materials for the polyol component. Such bio-based polyols are formulated to reduce or eliminate volatile organic compounds, as well as to eliminate petroleum from the SPF value chain, both of which reduce the global warming potential of foam applications. Work is also ongoing to develop fully or partially bio-based isocyanate materials, such as a methylene diphenyl diisocyanate (MDI) from BASF which is initially being introduced as Lupranat® M 70 R, and it is expected that additional varieties of bio-derived isocyanate materials will emerge at commercial scale for use in SPF in the near future. In this regard, the systems herein can also have usefulness for making SPF where the parts A and B are each fully or partially derived from non-petroleum sources. The systems herein are configured to generate appropriate metering, heating, and mixing of dual component systems to generate SPFs having accurate on ratio mixing to create high quality foams using a low pressure dispensing system.

In a further implementation, fire-retardant/resistant particles can be incorporated in one or both of parts A and B for delivery into the system from the respective unpressurized containers. By way of explanation, "fire-retardant" generally refers to a function imparted by a chemical or chemical family. A fire-retardant is a substance that is used to slow down or stop the spread of fire or reduce its intensity. This is commonly accomplished by chemical reactions that reduce the flammability of fuels or delay their combustion. Fire-retardants may also cool the fuel through physical action or endothermic chemical reactions. Fire-retardant materials incorporated in either or both of the parts A and B in a plural component system, such as those described herein, are activated by the presence of an ignition source and are intended to prevent or slow the further development of ignition by a variety of different physical and chemical methods. A variety of different chemistries with different properties and molecular structures can provide fire-retardant attributes when used in certain products. In some applications, it is possible to combine these chemicals to maximize effectiveness. Finished products that incorporate fire-retardants and that meet testing requirements can then be said to comply with one or more applicable building code fire performance standards for a particular residential or commercial application, The definition of a fire-retardant SPF coating is not clear-cut and often confused or interchanged with the term "fire-resistant," but there is a distinction chemically, A fire-resistant SPF does not ignite or support flame when an ignition source is applied, while a fire-retardant coating protects the substrate from burning. In performance-based testing, the mechanism of protection is secondary to the final result in relation to the disclosure herein: when particles are added to either or both of the parts A or B materials applies for generation of a SPF for the purpose of affecting the behavior or performance of the subject foam when exposed to circumstances where an ignition source and/or flame may be present it will be expected that the subject particles can be effective to reduce the propensity of the SPF to ignite and/or catch on fire. Since the present disclosure is directed primarily to the incorporation of particles from a plural component delivery system, the actual mechanism by which fire protection is conferred by a subject particle type may be referred to by the interchangeable term "fire resistant/retardant" unless the context demonstrates otherwise.

As would be appreciated, while polyurethane SPF systems can impart excellent insulation properties to the surfaces to which they are applied, these materials can exhibit flammability. Moreover, as organic materials, toxic chemicals can be generated during pre-ignition and when burning occurs. Building and fire codes therefore place strict fire performance criteria on SPF and their use in building applications. To this end, building codes throughout the U.S. mandate that a thermal barrier, such as drywall or a fireproof top coating, be applied over polyurethane SPF surface coating in most locations in a building. Such solid or coating thermal barrier is required to generate a barrier that will last at least 15 minutes to provide additional time for a person in the building to escape prior to ignition of the polyurethane foam. As would be appreciated, such thermal barriers can increase the cost and complexity associated with the use of SPF.

A type of fire-retardant material that is used in a SPF are intumescent materials. When intumescent materials, such as graphite or graphite-containing materials, are used in the SPF systems of the present disclosure, a polyurethane foam applied to a surface via the methodology herein can provide a SPF with a Class A flame spread rating of less than about 25 as defined by the standard set from in one or more of ASTM-E-84-22, UL-723 (2018) or NFPA 255 (2006). Each of these tests is described in detail in U.S. Pat. No. 9,745, 440, previously incorporated in its entirety by reference. A polyurethane foam applied to a surface can meet this building code-relevant ratings substantially without need to apply a fire-retardant topcoat or paint, such as provided by DC315 fireproof paint (International Fireproof Technology, Inc., Irvine, CA) or similar products. Such ratings can also be generated without the application of a surface barrier, such as drywall.

Intumescent materials have found utility in SPF systems when used as surface coatings. As would be appreciated, an intumescent material is a substance that swells as a result of heat exposure, thus leading to an increase in volume and decrease in density. An intumescent is a material that is a poor heat conductor and that increases in volume and decreases in density when it is exposed to heat. These are desirable properties for applications that require a fire-retardant or fire protection. Intumescent materials can be used in passive fire protection, such as via inclusion in spray foam materials, as disclosed in U.S. Pat. No. 9,745,440, the disclosure of which was previously incorporated herein in its entirety by this reference.

Suitable intumescent materials can include graphite, expandable graphite, treated expandable graphite (e.g., encapsulated with sulfuric acid), or a combination of any two or more thereof. Graphite materials having utility for use in polyurethane plural component systems, as well as other plural component delivery systems, are described in detail, including with regard to the amounts and types that can be included, are described in detail in U.S. Pat. No. 10,017,943, the disclosure of which is incorporated herein in its entirety by this reference. The amount of intumescent material that can be incorporated in the SPF foam coatings of the present disclosure can be any amount that is effective to generate a desired or intended fire resistance according to an applicable building code, as discussed elsewhere herein.

The methodology herein can provide a SPF surface coating that impart fire protection to a cured foam via the inclusion of one or more fire-retardant/resistant particles in either or both of the parts A or B materials streams. In accordance with the low pressure methodology herein, the fire-retardant/resistant particles can be dispersed substantially consistently or evenly throughout the cured foam, such as throughout a cross-section of the foam and at the surface thereof. To this end, when a portion of the cured foam is examined, such as by generating a cross section of an applied foam, the number of fire-retardant/resistant particles dispersed therein are substantially or evenly dispersed in an equal amount throughout that section. Similarly, fire-retardant/resistant particles can be seen to be dispensed substantially uniformly over a surface area of the foam.

As disclosed in the '440 Patent, an intumescent material can be incorporated in either or both of the parts A and B materials supplies in an amount suitable to generate a SPF applied to a structural surface to impart a rating for a cured foam according to one or more of ASTM-E-84-22, UL-723 (2018) or NFPA 255 (2006). The cured foam can exhibit a flame spread rating of less than about 25, or less than about 20, or less than about 15, or even less than about 10. Yet further, the methodology herein utilizes a suitable amount of one or more intumescent compounds to achieve an ASTM-E-84-22, UL-723 (2018) or NFPA 255 (2006) smoke rating of less than about 450, less than about 400, less than about 350, less than about 300, less than about 250, less than about 200, less than about 150, less than about 100, or even less than about 50.

In another implementation, SPF polyurethane foams of the present invention can contain only one or more intumescent compounds in such amounts as to impart improved fire-retardant/resistant properties to the foam. In other words, the SPFs of the present invention can be substantially free from non-intumescent fire-retardant/resistant particles. By "substantially free" it is meant that the SPFs of the present invention can contain less than about 7.5 percent by weight based on the total weight of the foam and/or the foam-forming components, less than about 5 percent by weight based on the total weight of the foam and/or the foam-forming components, less than about 2.5 percent by weight based on the total weight of the foam and/or the foam-forming components, less than about 1 percent by weight based on the total weight of the foam and/or the foam-forming components, less than about 0.5 percent by weight based on the total weight of the foam and/or the foam-forming components, less than about 0.1 percent by weight based on the total weight of the foam and/or the foam-forming components, or even no amount (i.e., zero percent by weight based on the total weight of the foam and/or the foam-forming components) of one or more non-intumescent particles apart from the one or more intumescent compounds discussed above.

Methods used to impart flame-retardant and/or fire-resistant properties to SPF to meet fire safety requirements, such as ASTM-E-84-22, UL-723 (2018) or NFPA 255 (2006), can also comprise materials other than graphite or graphite-containing intumescent compounds. For example, aluminum trioxide can be added to impart fire resistance in SPF. The absence of halogenated materials in aluminum trioxide can be beneficial. The mechanism of ATH is physical and combines cooling with the formation of a protective layer and gaseous phase dilution. The ATH breaks down around 200° C. to aluminum oxide in an endothermic reaction with the release of water vapor.

In further implementations, the SPF foam generated according to the methodology herein can incorporate non-reactive halogenated phosphorus-based compounds such as, tris(1-chloro-2-propyl) phosphate or TCPP, which imparts increased fire resistance to the foams by generating both gas-phase, radical scavenging chlorine groups, as well as forming a char that is difficult for flames to penetrate. Non-halogenated materials, such as organo-phosphate compounds, organo-phosphite compounds, or organo-phosphonate compounds, as well as combinations thereof have started to replace halogenated materials. Exemplary organo-phosphate compounds include alkyl and/or aryl phosphate compounds such as butyl diphenyl phosphate, dibutyl phenyl phosphate, triethyl phosphate, and triphenyl phosphate, among others. Exemplary organo-phosphite compounds include alkyl and/or aryl phosphite compounds such as butyl diphenyl phosphite, dibutyl phenyl phosphite, triethyl phosphite, and triphenyl phosphite, among others. Exemplary organo-phosphonate compounds include alkyl, aryl, and/or hydroxyalkyl phosphonates such as diethylhydroxymethylphosphonate (DEHMP).

In addition to fire retardant/resistant particles used in SPF, the systems and methods herein also has utility for other polyurethane foam use cases. A variety of particulate fillers for cost reduction or mechanical properties improvement, among other benefits can be relevant in context. Particles having utility in such regards can include, in non-limiting examples, silica, glass fibers, aluminum hydroxide or starch, $Ca_3(PO_4)_2$, $CaCO_3$, $CaSO_4$ talc, and nanostructured fillers, such as carbon nanotubes and nanoclays.

For example, particles can be added to polyurethane foams to add density. Fillers can minimize the amount of chemical needed to achieve the density and increase the weight of a foam pad or sheet. The production of foams reinforced by particles can lead to an increase in the mechanical properties of the polymer matrix of a polyurethane pad or sheet. Fillers can be added to polyurethane foam sheets or pads to increase compression strength or provide additional reinforcement to allow the form to not distort from weight of structures being placed on the foam or for impact resistance.

SPF are also used in pipelines as trench breakers. Trench breaker foaming systems are temporary or permanent barriers installed in pipe trenches at regular intervals to prevent trench collapse, such as those disclosed in U.S. Pat. No. 8,568,061, the disclosure of which is incorporated herein in its entirety by this reference. Foams used in such applications can include fillers so that cathodic protection for the pipelines is not adversely affected. For example, electrically conductive graphene particles can be incorporated therein, such as disclosed in U.S. Pat. No. 10,968,326, the disclosure, of which is incorporated herein in its entirety by this reference. Carbon black can also be used to impart conductivity to polyurethane foams, as is disclosed in U.S. Provisional Patent Application No. 63/024,802, filed May 24, 2020, which is available as a priority document in the PCT record of application PCT Publication No. WO 2021229044A1, each of which is incorporated herein in their entireties by this reference.

In a further implementation, powdered dyes or pigments can be incorporated into either or both of the parts A or B materials supplies. In this regard, most chemical manufacturers use liquid dye packages to color SPF. The powdered dyes or pigments can be less expensive; however, they can be difficult to process. The methodology herein can have utility in imparting color to SPF and other polyurethane products.

Further, while the above discussion in relation to particle additions has been specifically directed toward polyurethanes in the form of spray foam used for spray foam insulation, surface coatings and/or injection molding-type applications (e.g., seating, coolers, sips panels, spas, boats etc.), it is to be understood that fire-retardant/resistant particles and/or other particle types can be added to other plural component systems, such as polyurea and epoxy systems as discussed hereinafter.

In use, it has surprisingly been discovered that the use of low pressure SPF systems can greatly enhance the ability to apply the foam to a surface when the foam includes particles that are incorporated therein for the purposes of conferring fire retardancy, or to impart other useful properties as discussed hereinafter. By way of explanation, the inventors have determined that when a solid particle fire-retardant/resistant material is incorporated in a plural component SPF system applied at high pressure (i.e. at pressures of 250 psi and greater or greater than about 500 psi or greater than 1000 psi), the particles can cause several issues that can detract from the utility thereof for use with fire-retardant (or other) particles. The inventors have determined that the use of low pressure application methodology as described herein can reduce or eliminate one or more of these problems identified with the use of high pressure SPF application methods, while still allowing a relatively high volume of SPF to be delivered as a coating etc. Accordingly, the systems and methods herein can provide a SPF coating that substantially meets a specified characteristic for that foam that is defined by one or more of parts A:B ratio, R-value, foam density, fire retardancy, conductivity, among other useful properties.

First, while plural components are being pumped through a high pressure proportioning system, the particles can become seated in the ball valve, thus reducing or preventing the sealing needed to generate suitable materials stream flow. This can, in turn, can reduce the ability of the proportioner to generate the correct amounts of material streams in each stroke of the pump. When the pump is not operating as intended—that is, according to instructions input into the proportioner operation—the plural component materials streams can then be off ratio when they combine for mixture and application to a surface. An off-spec SPF coating can then result, such that the foam coating does not comprise the amounts of parts A and B that were defined by instructions input into the proportioner. The inventors have determined that when low pressure application methods are used, issues with particles negatively affecting the pumping aspects of the system can be substantially avoided. In other words, use of the low pressure systems and methods of the present disclosure can improve the ability for a specified parts A and Bs ratio to be generated at the point where the parts A and B mix at or near the spray gun dispensing location.

Further, the incorporation of particles in either or both of the parts A and B in high pressure delivery systems necessitate that filter screens be removed from the system which, of course, are included in high pressure spray guns to remove small particles from the parts A and/or B materials streams in order to remove small particles that can cause clogging of the small orifice from which the impingement mixed SPF is dispensed. The inventors have determined that use of the low pressure mixing systems and methods can allow use of a spray gun configured without a filter screen.

Additionally, when used with a high pressure system that uses impingement mixing, the inventors have observed that the solid particles can clog the smaller impingement ports due to the small size required to generate back pressure needed to make the impingement mix work properly. The frequent need to clean a high pressure SPF applicator that operates according to impingement mixing is believed to have reduced the utility of the methodology of the '440 patent's method. In contrast to that method, the low pressure spray foam application method that does not utilize impingement mixing has been determined to generate a SPF foam for application to a surface substantially without clogging/fouling of a mixing chamber forward of an exit location for the mixed foam at least because the parts A and parts B materials streams do not mix inside the spray gun, as is discussed elsewhere herein.

Next, the centrifugal force imparted in impingement processing used in high pressure SPF systems has been found by the inventors to allow added particles to churn or swirl through the mixing chamber, with centrifugal force seeming to cause some of the particles to separate from the mixture of parts A and B in the impingement mixing chamber. This, in turn, has been observed to often result in an uneven mixture that is exhibited as SPF coatings having non-consistent particle distribution in the cured foam. From such non-consistent particle distribution, it can be inferred that any fire-resistant/retardant particles, which is the reason for the particle addition in the first order, would also be inconsistently distributed throughout a cross section of the cured foam that is applied to a surface. It then would be expected that the SPF coating may not provide intended/specified fire retardance/resistance in use.

The amount of particles, whether fire resistant/retardant or otherwise incorporated in a cured polyurethane foam delivered from the plural component systems herein can be from about 1 percent by weight to about 50 percent by weight, or from about 1 to about 20% by weight, or from about 1 to about 10% by weight, or about 1 to about 5% based on the total weight of the cured foam and/or the foam-forming components. In another implementation, the amount of the one or more particles present in the cured polyurethane foam of the present invention is from about 2.5 percent by weight to about 45 percent by weight based on the total weight of the foam and/or the foam-forming components, or from about 5 percent by weight to about 40 percent by weight based on the total weight of the foam and/or the foam-forming components, or from about 7.5 percent by weight to about 35 percent by weight based on the total weight of the foam and/or the foam-forming components, or from about 10 percent by weight to about 30 percent by weight based on the total weight of the foam and/or the foam-forming components, or from about from about 12.5 percent by weight to about 25 percent by weight based on the total weight of the foam and/or the foam-forming components, or from about from about 15 percent by weight to about 22.5 percent by weight based on the total weight of the foam and/or the foam-forming components.

In another implementation, the instructions associated with the fluid handling system can be configured to generate a viscosity for each of the part A and part B materials that are substantially matched. The viscosity for each of the parts A and parts B materials can be within about 20%, 10%, or 5%. For example, if the viscosity of the part A material is about 1000 cps, the instructions associated with the fluid handling system can be configured to generate a viscosity of the parts A and B material streams of from about 800 to 1200 cps, or from about 900 to 1100 cps, or from about 950 to about 1050 cps. A differential amount of heating needed to adjust the viscosity of the part B material stream can be determined experimentally, with the results therefrom incorporated into instructions associated with the fluid handling system.

Yet further, and as would be appreciated, particles that are incorporated in a storage container (e.g., drum, tote, etc.) may settle prior to use. The unpressurized storage container can therefore comprise an agitator, mixer, etc. that can be configured to provide suitable dispersion of any particles that are incorporated in either or both of the parts A and B materials prior to dispensing thereof. The inventors currently understand that as long as suitable mixing, agitation, etc. of either or both of the parts A and/or part B material streams is provided prior to delivery of the material into the process via the proportioner, the amount of particles in the subject materials stream can be consistent upon mixing of the materials streams at the exit of the spray gun and as dispensed at the end of the delivery nozzle.

Figure 4:
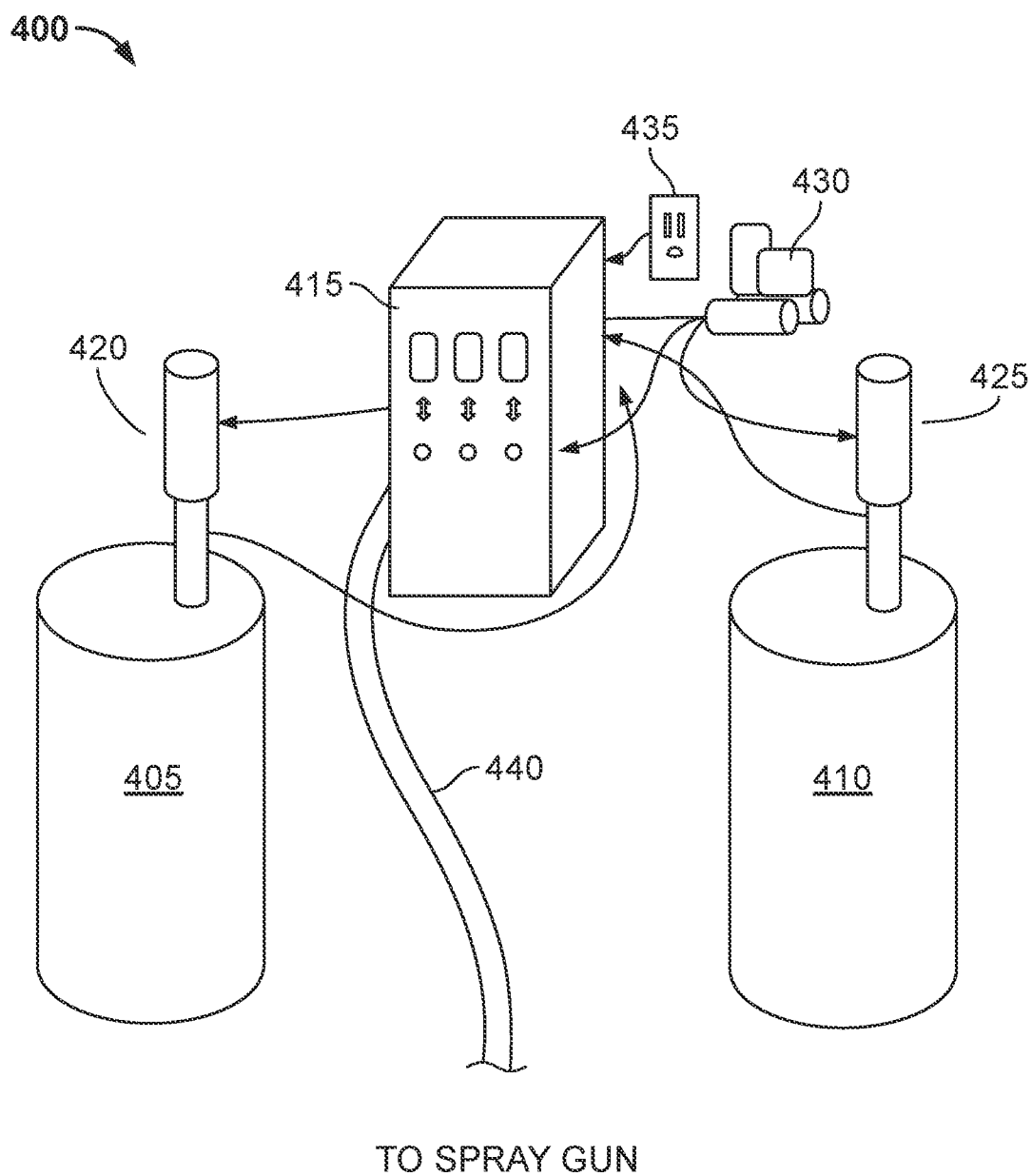
FIG. 4 illustrates an example of a system for low pressure delivery of materials, in accordance with various embodiments of the present disclosure.

FIG. 4 shows arrangement 400 for delivery of the parts A and B materials from unpressurized supply sources 405 and 410, which can be 55 gallon drums, 250 gallon chemical totes, tanker cars, etc. In use, fluid handling system 415 can be configured with instructions, such as via software and electronic controllers, to engage with pumps 420 and 425 to remove a metered amount of the parts A and B materials from 405 and 410. For illustration purposes, transfer pumps 420 and 425 are shown as separate pumps at each of containers 405 and 410. However, fluid handling system 415 can also include a mechanically linked pumping system associated with fluid handling system.

In this regard, a "mechanically linked pump" is a system wherein a pump for each of the A parts and B materials are in mechanical engagement with each other via a shaft or yoke so that each of the pumps operates at the same rate. On ratio mixing of the parts A and B materials can be facilitated by use of such a system at least because the rate at which the materials streams—and thus the volume thereof—are transported to the spray gun for mixing and dispensing is a function of a direct mechanical operation—that is, equivalent movement of each pump in each stroke—as opposed to relying on a flow meter indirect measurement of an amount of each of parts A and B materials flowing through the system. For example, a flow meter must be properly calibrated to ensure that the amount of materials flow reported therefrom is the amount of material that actually flows through the system into the spray gun and that is mixed. When incorrect flow is detected, the system will report an off-ratio flow that will then have to be corrected before the SPF application event can be started or continued. The use of a mechanically linked pump in the fluid handling equipment can ensure that the correct amounts of parts A and B materials provide for delivery can be metered in accurate amounts in the first order into the heated hose and downstream thereof. It could be said that a mechanically linked pump is a direct measurement of flow, as the distance that both pumps move simultaneously defines an amount of material that is dispensed.

The mechanical action by which the parts A and B materials streams are pumped via the fluid handling equipment can also help account for viscosity differences that exist between the materials. To this end, an isocyanate-containing part A portion typically can be expected to have a viscosity of significantly less than that that of the polyol-containing part B portion. In a non-limiting example, the native viscosity (e.g., a room temperature of about 25 deg. C.) of a typical part A isocyanate-containing component can be from about 50 to 100 cps, whereas the native viscosity of a typical polyol-containing part B component can be at from about 500 to 1000 cps. As would be appreciated, the pre-heater functionality in the fluid handling equipment can suitably reduce the native viscosity of the polyol component, however, at least some viscosity difference will be found between the parts A and B even after pre-heating.

The use of a mechanically linked pump has been found to allow a higher viscosity polyol-containing part B material to be accurately metered along with the lower viscosity part A, to result in a suitable mixing operation when the parts A and B materials meet in the static mixing nozzle. To this end, the use of a mechanically linked pump that has improved metering capability has been found by the inventors herein to allow a heating of the part B material a temperature of about 95 to about 100 deg. F., in contrast to the about 125 deg. F. that is conventional which can, in turn, reduce the amount of energy needed to operate the system. The temperature of the part A material can be matched to be substantially the same as the part B material.

Still further, the fluid handling equipment can be configured to generate a maximum pressure level in the device at about 500 psi maximum at the fluid handling system and less than 250 psi at the dispensing nozzle. Such fluid handling equipment will thus not be useable for a high pressure SPF system. This system can nonetheless generate SPF mixing when used in accordance with the present disclosure.

Fluid handling system 415 is also configured with heating features (not shown) that provides a suitable pre-heating to each of the parts A and B materials streams after removal from unpressurized containers 405 and 410. Fluid handling system 415 is engaged with electrical supply 435, where 240V is appropriate to generate the power needed to operate the system in use. When a mobile rig is being used, the electrical power can be provided by a generator or another type of power source. Air compressor 430 is shown in communications engagement with fluid handling system 415. Air compressor 430 can be engaged directly with and through heated hose length 430. As would be appreciated, fluid handling system 415 used in the present disclosure should be configurable for low pressure applications in accordance with the methods and systems herein. In this regard, in use, fluid handling system 415 is configured to meter an appropriate ratio of parts A and B materials as needed in a particular use case and a pressure will be provided to each of the respective material streams of less than 250 psi.

Heated hose length 440 communicates the appropriately pre-heated and metered parts A and B material streams via separate fluid paths/conduits (not shown) along with air input(s) (not shown) suitable to provide air to a spray gun (not shown) engaged thereon according to the disclosure herein. Although not shown, conventionally, fluid handling system 415 and/or air compressor 430 is configured or associated with an air dryer to ensure that air reaching the spray gun and the material streams does not contain water.

A number of fluid handling systems can suitably be used in the low pressure SPF systems and methods herein. Suitable machines come in various shapes, sizes, and equipment configurations and are available from several manufacturers. Some relevant issues to consider when purchasing a machine include:

Drive System (Electric, Hydraulic, or Pneumatic)
Output (in gallons per minute, or gpm)
Pressure capacity (in pounds per square inch, or psi)
Heating capacity (in kilowatts, or kW)
Electrical system sizing As discussed herein, the fluid handling equipment will be operational to allow the SPF to be dispensed at the end of the disposable mixing nozzle at less than 250 psi. Pressure can be detected at a fluid handling equipment outlet location at or near a connection location proximate engagement of the fluid handling equipment and a forward end of the heated hose length. Pressure can also be detected at a location proximate to a terminal end of the heated hose length and the forward end of the whip-hose element. Yet further, pressure can be measured at terminal end of the whip hose element and a point of connection of a terminal end of the whip hose element and a corresponding spray gun connection. Such pressures can be recorded, reported, and otherwise used as set out herein.

Flow meters can be included in the systems herein to record the amounts of parts A and B materials exiting the fluid handling equipment and flowing downstream therefrom. Data from the flow meters can be analyzed with other operational information for use to improve operation of the systems in subsequent processes. For example, by measuring the flow of the parts A and B materials in a plurality of SPF application events against a known true amount of materials flowing through the system, flow meter sensor data can be correlated with operation of the mechanically linked pump to enhance operational information derivable from the system in use.

The Graco Reactor 2 EXP Elite Proportioner, (Graco Minnesota, Minneapolis, MN), which is believed to be disclosed, at least in part, in U.S. Pat. No. 11,184,689, the disclosure of which is incorporated herein in its entirety, is a commonly used device for high pressure SPF applications. The inventors have determined that this device, and similar ones, can be configured to work with the systems and methods herein. As disclosed in the '689 patent, the fluid handling system is configured to pump and heat the components of a two-part process. That system is configured to produce duty data and programmed pressures and temperatures, as well as to record via sensors data generated during operation and to communicate such information. Reports can be generated and information and generated operational information can be provided to a user via a graphical user interface. Data captured by the fluid handling systems of the '689 patent include information relevant to the operation of the fluid handling system, namely, actual and intended (i.e., "commanded" or programmed) pressure and temperature, "duty data," (i.e., hours of operation, device on-time, pump cycle data, and the like. Information associated with the devices believed to be comparable to the fluid handling systems of the '689 patent indicate that the referenced Graco fluid handling system can monitor material amounts in used and remaining in storage tanks, system events such as startup and shutdown times, and daily chemical output. Multiple process formulations can be programmed and called up for specific use cases. In various implementations, the low-pressure systems of the present disclosure can use such "advanced" fluid handling equipment, as long as the systems have suitable low pressure capabilities as relevant to the systems and methods herein.

Another fluid handling system suitable for use in the low-pressure methods herein is the Nitrosys™ fluid handling system made by the assignee of the current application. This device will heat the parts A and B materials, meter the materials by volume, and convey the heated and metered materials to an engaged heated hose length configuration for communication thereof to the metal spray gun. The Nitrosys fluid handling system is configurable with data collection and sensor equipment as discussed elsewhere herein.

The Nitrosys fluid handling system suitably uses a 3:1 transfer pump configuration and a maximum pressure rating of 500 psi. The pumping operation is provided by a mechanically linked pump to generate suitably precise metering, as discussed previously. This higher pressure rating, while still significantly less than that used in a high pressure dual component fluid handling system, can reduce the propensity for seals and other components to fail as a result of back pressure that may occur when the parts A and B materials are resident in the hose and the trigger is not activated to allow materials flow out of the spray gun. Notably, however, use of such an upper pressure-limited system can increase the safety of a SPF application by ensuring that the system is not operated at high pressure in error.

In certain aspects, the power supply system can be controlled through a power supply system, such as a J1939 CAN BUS connector. By using the J1939 CAN BUS, the fluid handling system and other components can connect to any engine and read the data from the engine, and all of the sensors in place on the engine.

As noted, in SPF systems, a fluid handling system is engaged with a heated hose length configured to communicate each of the heated and metered Parts A and B materials from the fluid handling equipment to the spray gun for mixing and dispensing thereof to generate a SPF. Each of the parts A and B materials streams are respectively communicated through the heated hose length in respective materials fluid paths/conduits. The air streams for the spray gun are also individually communicated in respective fluid path/conduits. In some use cases, as discussed hereinafter, a water fluid path/conduit can be included. Wiring for operation of various sensors configured in one or more locations along the hose length and/or for communication of sensor information from an engaged whip hose can also be operational in the hose.

The characteristics (e.g., pressures, temperatures) applied by the fluid handling system to each of the individual parts A and B metered materials streams will be substantially maintained during communication in the entire fluid path/conduit from the fluid handling equipment through the hose length, whip hose length, and into the metal spray gun. To this end, it is relevant to ensure that the heating componentry of the hoses is suitable for a particular use case. Also, longer hoses can be expected to require additional power to be applied to maintain the temperature as appropriate for a SPF application event.

Heated hoses are generally available in 25, 50, or 100-foot lengths, and are typically configured with heating elements, temperature controllers, temperature sensors, insulation, and protective jackets to prevent puncturing. Various SPF applications can require long lengths from the fluid handling system to the point of application, such as when used with spray rigs that are ported from location to location. Because heated hoses do not actually heat up the material, but rather prevent the metered parts A and B material streams from cooling down too much by the time they reach the metal spray gun, sensors present along the hose length can enhance the ability to measure and, if necessary, provide temperature adjustment as needed.

Heated hoses used in accordance with the present disclosure are configured to operate on 220 Vac to 240 Vac 60 hZ power and utilize 7 amps per 50 ft section. Heated hoses can be provided in a plurality of lengths or a combination of lengths that when connected appropriately can create a desired length. A plurality of hose lengths can be configured to be engageable and disengagable to generate the length as needed for a specific application. This can be helpful when the logistics of a jobsite require equipment to be set up close to the area where the SPF is being applied. A maximum heated hose length suitable for use in SPF applications is typically in the 200-310 ft. range. Properly configured fluid handling equipment for use in SPF applications can allow operation at hose lengths shorter than the maximum rating but running at lengths greater than the maximum rating can result in an inadequate heating. Longer hose lengths can require the machine to supply more electrical current (amps) to the hose to supplement the longer length.

With respect to the temperature maintenance along the entire hose length, prior art hose heating elements are understood to typically via a copper wire band that is spiral wrapped on the interior side of the hose with a protective polymer/butyl covering along the interior surface of the hose to shield the wiring from the other parts of the hose. This wire is supplied with low voltage electricity engineered at a pre-set electrical resistance level to create the desired temperature. The heat is then conductively transferred from the outside of the hose into the liquid components within the hose. The butyl polymer covering that is typically used is understood to only act as a protective covering to protect the heating elements, but it has a low vapor transmission permeability level to reduce the possibility that moisture will enter the hoses to possibly effect the part A material stream. As would be appreciated, water can react with the isocyanate to damage the hose and lead to other processing problems.

In implementations, the hoses used in the systems and methods herein comprise an improvement of at least the heating method in which the parts A and B fluid paths/conduits are each, independently, configured with a heated cable or wire wound around each respective materials line/conduit along a length thereof. This configuration has been found by the inventors herein to provide more effective maintenance of an applied temperature by the fluid handling equipment at least because the heat is applied primarily to each of the parts A and B materials streams instead of to the hose as a whole. It follows that the total amount of power required to maintain effective heating of the material streams can be less than in prior art systems. When a water conduit is included in the heated hose, as discussed elsewhere herein, the energy savings from wrapping of the parts A and B materials stream fluid paths/conduits can be substantial, as water has a very high specific heat capacity. Since water would only be needed to flush the system (if it is used at all), the ability to conserve energy by maintaining only the heat required for maintaining the applied temperature for the parts A and B material steams can be expected to generate previously unrealized energy efficiencies with and without use of a water flush in the spray gun.

In some implementations, the fluid handling system configured for use with the systems and method herein can detect the length of the hose being used in an application and automatically set the required amperage needed for generating and maintaining the required heating for that hose length. Alternatively, the fluid handling system can be configured to allow a user to manually set the heating characteristic to match the length of hose for each application. Instructions can be provided to the user in this regard.

Other features of the hoses used in the systems and methods herein include:

Wiring Plan; 1 hot wire (120 Vac) assigned to A side, 1 hot wire (120 Vac) assigned to B side, Common neutral wire. Ground wire is also crimped to hose fittings, and a stainless steel hose jacket serves as PE Ground.

Hose heat is carried through 3 pin circular connectors at each hose junction

Each hose section has an additional set of wires that jump ahead to the end connector to provide power to the next 50 ft section of hose.

Each hose is insulated with synthetic fiber felting.

M12 8 wire data cable is run in each 50 ft section of hose.

In standard hose there is a ⅜" air line.

SPF application hose includes a whip hose and a fluid temperature sensor (RTD).

Heated hose utilizes individual solid-state relays to switch the power for each hose length for hoses that are connected in serial.

Heated hose is protected by a primary circuit breaker and an additional GFCI breaker.

For time shot applications there can be 4 additional 5/16" diameter tubes running down the hose, 1 clear to open the air cylinder on the gun, 1 black to close the air cylinder, 1 blue for water flush functions, and 1 clear for air nucleation or air purge A terminal end of a heated hose length is configured for engagement with the spray gun via a collection of conduits extending from an end of the spray gun. A whip hose 315 can be configured at the terminal end of the heated hose length for connection to the spray gun as discussed above with FIG. 3. As would be appreciated, a whip hose is short length of hose, for example 3, 5, or 10 feet incorporating a swivel coupler to allow the longer and heavier heated hose and spray gun to move more smoothly during use.

In implementations, one or more wired or wireless sensors can be incorporated in a whip hose that is engaged with the terminal end of the heated hose and forward of the metal spray gun. The utility of a whip hose can be enhanced by incorporation of temperature and/or pressure sensors therein, as measurement at this location can generate enhanced information about a SPF application process given the closer proximity to the location where the parts A and B materials streams are mixed and then dispensed from the mixing nozzle. Such sensors can be in wired or wireless communication engagement with the fluid handling equipment and/or other data collection componentry.

To date, all data collection in SPF applications has been from the heated hose and the fluid handling equipment. Notably, the form and function of the spray SPF is primarily dependent on the characteristics of the SPF when it exits the mixing nozzle. Current data collection methods via sensors configured upstream of the spray gun can only create an inference that the SPF delivered at the nozzle end has the desired or intended characteristics. The inventors have determined that the generated sensor data does not always match the actual SPF behavior at the mixing nozzle end. For example, the sensors associated with a fluid handling system may indicate that a current SPF application is correctly operating, but the actual SPF exiting the nozzle may not be suitable for application. The spray gun itself may be defective or damaged, and information associated with spray gun operation is not available in prior art methods. The spray gun may also be incorrectly assembled, such as by use of parts that generate materials fluid paths/conduits that are too large or too small for a particular use case. Sensors that measure flow, pressure, temperature, etc. at the whip hose may be more suitable to read aberrant measurements at or near the spray gun due to the closer proximity to the SPF delivery location.

Moreover, air input into the spray gun forward of the parts A and B materials entry points as needed to provide the enhanced mixing at low pressure as discussed herein introduces another operational variable into a SPF application event. Therefore, the inventors understand that collection of information associated with spray gun operation via one or more sensors positioned proximate to the metal spray gun in the whip hose to acquire information directly related to the operation of the spray gun itself can be useful in some implementations. For example, a sensor can be engaged proximate to a ball valve that is part of one or more engagements between materials streams, air streams or water (if present). The characteristics associated with flow adjacent to the ball valve can be identified by the sensor and information associated therewith reported to the system for real-time data generation, as well as for recording for subsequent use.

As non-limiting examples, the actual pressure of the air being introduced into the parts A and B material streams could be detectable from a sensor proximate to the point of engagement of the air stream conduit to the locations where air is input in the parts A and B material streams (e.g., 115a and 115b in FIG. 1). Yet further, to date, pressures at the spray gun exit can be derived from sensed pressures at which the parts A and B materials streams are introduced into the guns can be detected.

As would be appreciated, the pressure at which SPF foam is dispensed from a spray gun dictates safety protocols for SPF applications have not been collected on each jobsite. The inclusion of sensor capability proximate to a spray gun in the whip hose can allow data to be collected for each technician, jobsite, etc. to allow information about real time operation to be generated, as well as to provide historical records of each SPF application.

In other aspects, the SPF application systems of the present disclosure can be provided in kit form, whereby a contractor can acquire the equipment needed as a mobile collection configured to provide a "plug and play" operation that can move from jobsite to jobsite. These mobile collections of SPF application equipment—also termed "rigs"—can include the auxiliary equipment needed to completely store and operate a SPF application business, including the unpressurized parts A and B material sources, the fluid handling system (e.g., pumps, heaters, etc.), air sources, power sources, hoses, spray gun, nozzles, and other equipment. In implementations, the kits configured as mobile spray systems can include spray systems including as a control center comprising a programmable logic controller (PLC) and/or human machine interface (HMI), which can be built into the mobile rig.

The mobile rigs comprising low pressure SPF applications can provide a number of advantages over the prior art:
- a single hub for all equipment in a mobile spray rig to be captured;
- all spray equipment, and auxiliary equipment onto one screen and into one system;
- records spray equipment data and auxiliary equipment into a single data collection, including recording of the dispensing pressure of the nozzle;
- reporting for all spray equipment and auxiliary equipment to collect equipment operational data and to better ensure technician and jobsite safety;
- generate maintenance records associated with all spray equipment and auxiliary equipment;
- generate technician and jobsite safety records for each SPF application event;
- generate information about SPF application in new or existing construction for use in building information models, environmental reports, or other purposes
- GPS Fleet Tracking and management built into the Mobile Spray Rig; and
- monitor operation of multiple rigs at a central location via a dashboard.

In implementations, a control center for the mobile systems as described herein can be configured for communications engagement, via Wi-Fi, Bluetooth, cellular signal or RFID, to a cloud computing system configured receive data generated from operation of the mobile spray system. As noted, the mobile SPF system can also be configured with or be in communications engagement with sensors operational to detect and transmit information about environmental conditions proximate to a SPF application location. For example, temperature, humidity, and barometric pressure sensors can be associated with the SPF application system. Such sensor capabilities can also collect information about conditions in which the rig is maintained, for example, to generate information about whether the parts A and B materials supplies were subjected to heat or cold that exceeds the recommended storage conditions for these chemical components. The unit also can have a built-in GPS system inside of the telematics module for rig tracking.

Yet further, the real time data collected on a plurality of jobsites can have utility in configuring instructions for subsequent SPF application events. A collection of data can improve the selection of the various parameters relevant to SPF application. To date, the inventors understand that information associated with individual SPF application events resides in the knowledge base of individual technicians and/or in the businesses that employ them. Systemic collection of information generated on plurality of jobsites by different contractors can be expected to enhance operation of SPF application events. In this regard, the parameters of a current SPF application event can be compared to a data collection for a plurality of past SPF application events to generate instructions for the current event.

For example, if the data generated from past events indicates that the environmental conditions associated with a current event is likely to cause the SPF application to be sub-optimal, the current event can be rescheduled for a time when the conditions are better. Still further, if information derivable from a collection of past SPF application events indicates that a ratio of part A to part B materials to be applied in a jobsite or in a bulk application does not provide the intended or specified foam characteristics, the application parameters can be modified.

In an implementation, the systems and methods can be used to install/apply low density SPF. As would be understood, low density SPF is an open cell foam having a density of about 0.5 pounds per cubic foot. This type of foam is generally applied as a sprayed coating to structural surfaces provide a continuous insulation and air-sealing barrier. The open-cell structure of low-density SPF imparts flexibility to the cured foam. Low-density SPF can be applied on walls, in unvented attics, ducts and ceilings, and in vented attics and crawl spaces. It is impenetrable to air, but penetrable to moisture.

In a further implementation, the systems and methods herein can be used to install/apply medium density SPF to structural surfaces. As would be appreciated medium density SPF is applied in an amount of about 2 pounds per cubic foot. It is a closed cell foam. Medium-density spray foam is a popular type of SPF that is commonly used in new construction homes and crawlspaces. Like low-density foam, medium-density SPF is often used for continuous insulation, interior cavity fill, and unvented attic applications. As a closed-cell spray foam, however, medium-density SPF has utility where there is need for the greatest R-Value insulation per inch possible, such as in tight spaces like crawlspaces. Medium-density SPF can also provide a high bond and tensile strength. It also can provide low vapor penetration and is typically not affected by moisture, such as rain, in typical applications.

The systems and methods herein also have utility for installation/application of high-density SPF. As would be appreciated, high density SPF has a density of about 3 pounds per cubic foot and, as such, has a denser structure than medium-density or low-density SPF. Therefore, more spray foam material is needed to cover and insulate any given space, especially since expansion is less than lower density foams. A typical application is performed by professional insulation contractors.

High density SPF also has utility for roofing applications, especially when complex shapes are present. SPF materials can be overlaid on metal, asphalt, clay and wood roofs. In addition to excellent insulation properties, high density SPF also has thermal resistance properties. In roofing applications, its thermal and vapor-delay qualities can provide benefits, while its strength can provide load support to the structure. High-density SPF can help reduce energy costs over the lifetime of the roof, while also offering protection against heat and water infiltration. It also strengthens the structure that it is applied to. The bond that high-density SPF forms to the roof can increase a building's resistance to wind uplift, which can help reduce damage experienced from high winds. As would be appreciated, high density SPF is typically covered with a membrane to complete the application so as to prevent UV degradation caused by sunlight.

The systems and methods herein can also be used for concrete lifting applications whereby SPF is incorporated in a crack or drilled hole. Upon incorporation of an uncured SPF foam mixture into a crack or hole, the foam will expand with a force needed to lift a concrete structure. In a non-limiting example, a ⅝" hole can be drilled through a slab into a subgrade. A tapered delivery port is installed into the ⅝" hole. The injection gun is connected to the port. The injection gun delivers the uncured SPF material through the port and slab. Expansion of the material occurs within seconds, compressing loose soils and raising concrete. Similar methodology can be used for void-filling (e.g., sink holes, loose soils, etc.), slab stabilization, and seawall repair.

The methods and systems herein can also be used in applications where bulk insulation properties may be needed, such as by applying a SPF coating to trailers, railcars, recreational vehicles, commercial refrigeration equipment etc. In such applications, the methods can be sprayed on surfaces, equipment, components, etc. as appropriate to provide a desired or intended amount of insulation (e.g., heat/cold, sound, vibration, etc.) or other property of interest (e.g., light weight structural support, pest resistance, etc.) that can be provided by application of SPF in context.

By way of explanation, industrial process that today use high pressure spraying in a factory setting require the employee protections also needed for use on jobsites. It could be expected that ensuring compliance with safety requirements may be more straightforward in a factory setting where employees are more likely to be under regular observation by supervisors. Nonetheless, it remains cumbersome for employees to wear full PPE as required in high pressure spraying applications. Such safety requirements also increase the costs for a manufacturer for the purchase of such equipment, as well as from ensuring that the equipment remains in good working order and that employees also comply with safety requirements. Moreover, it can be expected that an industrial setting may use higher volumes of SPF components on an ongoing basis because use of these materials comprises a basis of their business model. Thus, improvements in the safety of SPF molding processes can be realized without compromising attendant product quality.

Yet further, the systems and methods herein can have utility for use in marine applications where pour-in polyurethane foam applications are in use currently. For example, the polyurethane foam molding methods and systems of the present disclosure can allow the filling of a hulls for boats, paddleboards, or the like. In other implementations, the low-pressure systems can be used as a lightweight and insulating core or fill for a variety of applications such as:

Appliances
Commercial Refrigeration
Entry & Garage Doors
Foodservice Equipment
HVAC Products
Insulated Piping
Portable Coolers
Refrigerated Transportation
Rotational Molding
Structural insulated panels
Spas/hot tubs
Walk-In Coolers
Water Heaters In addition to the benefits that may be associated with the uses of SPF in an industrial setting, the low-pressure application/injection methods and systems can provide heretofore unrecognized benefits associated with the application of a bulk polyurethane foam in a fully enclosed or partially enclosed space, for example in a mold. Currently, such applications often employ technician intensive processes where a mixture of parts A and B materials are generated by weighing each of the parts and mixing them in a container etc. as a test formulation. The parts A and B materials mixture is then allowed to cure and the technician will test the cured composition for the expected/required properties. If the cured SPF does not meet the specifications for a use case in context (e.g., density, cell size, cell configuration, etc.), the technician will try another time. In other situations, a technician will generate a mixture of the parts A and B materials according to instructions, followed by pouring that material into a mold, such as a boat hull, etc. If the resulting component incorporating the cured polyurethane foam does not meet the required specifications, the entire product will be discarded and the technician will be required to start over again. In either case, the success of the process depends on variables such as the skill/diligence of the technician (e.g., to properly weigh, mix, and pour the polyurethane components), environmental conditions in the plant (e.g., moisture/humidity, temperature), and the accuracy of the instructions in the first order. Moreover, and as would be appreciated, such trial and error not only wastes time and increases the cost of molded polyurethane products/components, landfill waste is created.

It has been unexpectedly discovered that the methods and systems of the present disclosure can generate a mixture of parts A and B materials from unpressurized raw material supply containers dispensed via low pressure injection from the spray gun that can suitably flow into a fully or partially closed mold. Unlike use of high pressure spray guns which dispense the parts A and B materials mixture at pressures that are unsuitable for mold-filling operations (e.g., spray back and atomization will occur), the present methods and systems can generate an amount of flow to provide mold filling that can substitute for prior art pour in place processes. Moreover, use of a metal spray gun according to the configurations herein can enhance the ability to fill areas in a mold that might otherwise be difficult to fill using pour in place methods, for example, areas where corners might make it difficult for the parts A and B materials mixture to suitably penetrate prior to gelation or curing or areas where air bubbles might prevent flow. The low pressure methods and systems can be seen to provide excellent mixing of the parts A and B materials in a disposable mixing nozzle substantially without the generation of problematic airborne particles, while at the same time providing a suitable materials mixture flow.

The accuracy enabled by the use of electronically controlled and sensor-containing equipment can further be expected to provide improved products/components, at least because the trial-and-error method used in many applications today can be substantially eliminated. In other words, a technician no longer needs to individually weigh the materials, mix them, and pour the parts A and B materials mixture according to instructions. Instead, the required parts A and B materials amounts, mixing, and application parameters can be programmed into operation on an as needed basis. These can be termed "timed shots." Instructions associated with placement of a timed shot can provided to a technician, for example, in one or more entry ports in a mold or in areas where staged or planned placement of foam is pre-defined.

For the timed shot injection of SPF in a mold (or other application), the inventors have determined that it can be beneficial to utilize an electronically operated spray gun, as opposed to the manual/air operated one shown in FIGS. 1-3. An electronically operated spray gun can allow more precise dispensing/injection of SPF for applications where weight, density, etc. might be significant. For example, in some circumstances, indiscriminate filling of a mold with a parts A and B materials mixture can result in lower areas of a molded part being cured while the weight of additional parts A and B mixture is being poured on top. Such additional weight can result in lower levels of a cured foam having a higher density, as well as higher overall weight in the finished molded product. In use cases where the foam density and weight can be a significant factor in part quality, improvements in SPF application can be warranted.

To this end, the present disclosure includes methods and systems for precision dispensing of SPF into a mold for pour in place applications. The volumes dispensed can be up to about 100, or from about 15 to about 80, or from about 30 to 80, or about 50 to 80 pounds per minute. As would be appreciated, the amount of foam dispensed into a mold or for other applications can be as needed for a particular use case, however, the amount of dispensed should be maintained at a low enough volume to allow proper curing and densities in the cured foam to be generated. Such applications can utilize timed shots generated by instructions associated with a molding event. The metal spray gun can be held by an operator and the dispensing of the uncured foam from the spray gun can be via electronic control. In accordance with the overall benefits of the present disclosure, such high volume (e.g., up to about 80 or 100 pounds per minute) of foam dispensing is generated at low pressures, that is, below about 250 psi using non-pressurized parts A and B materials supplies. As would be appreciated, such high volume application processes can benefit from use of larger materials supplies, such as drums, totes, tanks, or the like.

In implementations, each timed shot can dispense a known/defined amount of mixed parts A and B materials per the unit of time during which the shot is operated. Such amount can be highly accurate, for example, at least about 95, 97 or 98% of the intended amount of foam to be dispensed in each shot. By application of a plurality of timed shots to inject an uncured foam mixture into a mold, a substantially accurate total amount of foam can be injected into a mold during an application event. For example, if each timed shot can substantially accurately dispense 200 grams of foam from the spray gun nozzle, and the molding operation calls for 2000 grams of foam to be injected into the mold, a technician can be instructed to inject 10 timed shots into the mold in a single molding operation. Moreover, to better ensure that the curing of successive layers of applied foam mixture do not place undue weight on lower layers that are not yet cured enough to refrain from being compressed, the shots can be timed via instructions associated with the electronically controlled spray gun. The technician can also be provided with instructions of locations in the mold where timed shots should be aimed/located.

Figure 5:
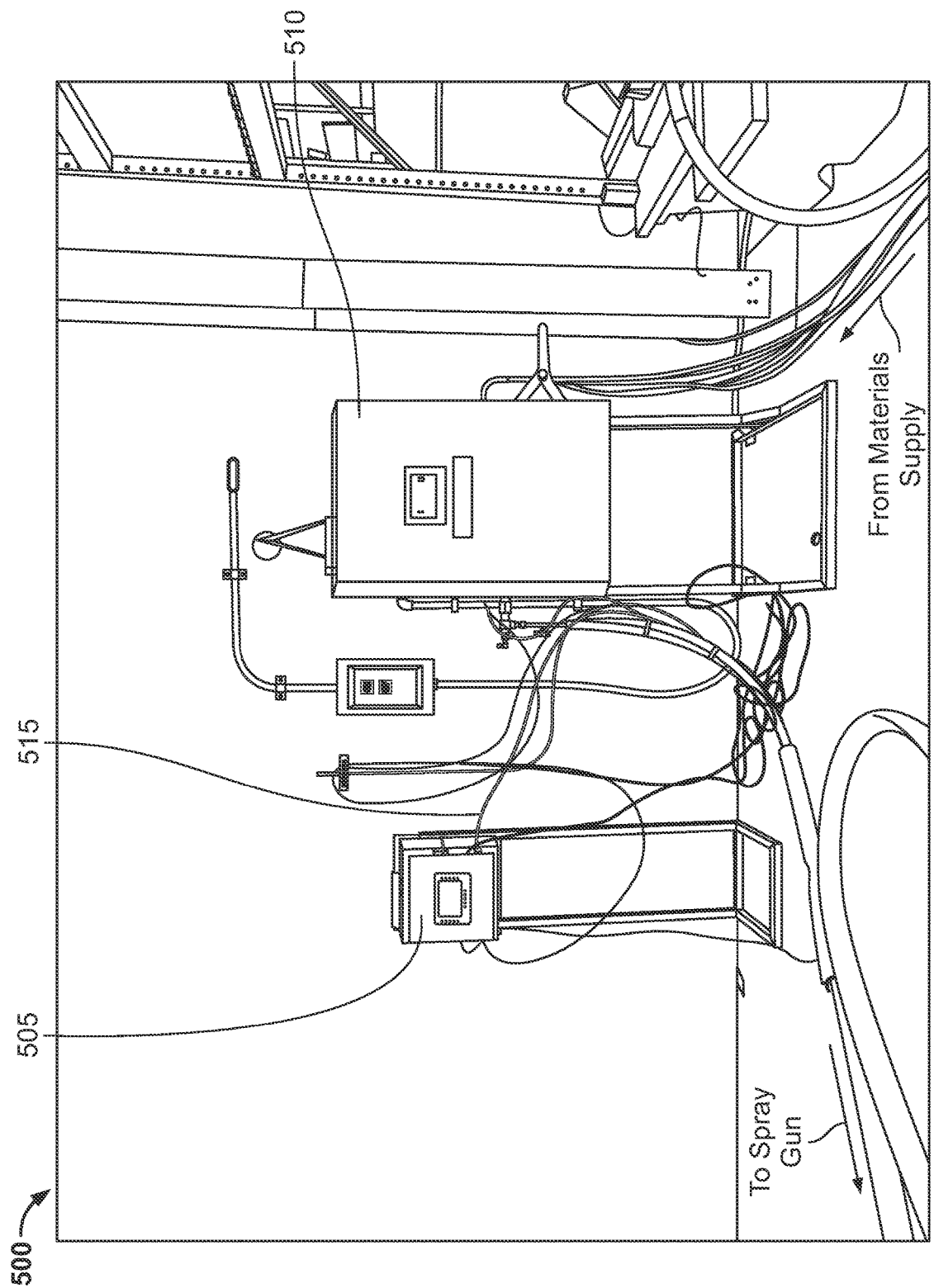
FIG. 5 illustrates an example of a polyurethane foam application configuration, in accordance with various embodiments of the present disclosure.

Referring to FIG. 5, a polyurethane foam application configuration 500 is shown with electronic spray gun control module 505 and a fluid handling system 510, here shown freestanding in a location, but which can be part of a spray gun rig, as discussed elsewhere herein. As shown, the electronic spray gun control module 505 is in wired communications engagement via wiring 515 with a spray gun (not shown) that is configured with an electronic trigger and foam dispensing system. As would be appreciated, communications of electronic spray gun control module 505 with fluid handing system 510 and any other relevant devices (e.g., cell phone, tablet, cloud computing device, etc.) can also be via wireless connection.

In a further benefit, since the parts A and B materials are delivered to the mold directly from the containers in which they are stored, the technician can be better protected from safety issues associated with handling of the materials when making a mixture. This is in contrast to existing hand preparation methods used for pour in place methods where a technician is required to combine the materials in a mixture, thus exposing him to potential safety concerns.

A further improvement associated with the timed-shot aspect of the disclosure is the ability to review the quality of a molded part and, if necessary, adjust instructions for making a part in future processes. For example, if a quality control inspection reveals that there are unacceptable differences in foam density along a cross-section of a molded part, the instructions can be adjusted to modify the timing of the shots to modify the curing behavior of the foam in subsequent processes. Such information can also have utility in designing instructions for new product designs. In this regard, generation of knowledge about how the foam application processes can affect the characteristics of a molded part would be an improvement over existing methods that are based on a technician's pouring of an uncured mixture of parts A and B materials into a mold without any attendant understanding of what is happening during the curing process. In short, to date, polyurethane foam molding processes have been a "black box." When a molded part does not meet quality control specifications, that part will often be rejected and marked as landfill waste. The data collection capability derived from use of an electronically controlled spray gun is expected to provide improvements in not only the manufacturing processes for molded polyurethane parts, but also in the generated parts.

While the description herein is directed primarily to a use case for a SPF—that is, where the parts A and B materials comprise an isocyanate-containing material and a polyol-containing material that are combined as a foam in a mixing nozzle for application to a surface or in a mold—it is to be understood that the dual component systems have utility for use to substitute for other two part chemical systems in which aerosolized materials that result from impingement mixing generated from high pressure. A polyurea coating is the result of a one-step reaction between an isocyanate component and a resin blend component. An example of such a system is polyurea coating application systems. For polyurea coatings, the isocyanate part A can be monomer based, a prepolymer, a polymer or a blend. For the prepolymer, amine- and/or hydroxyl terminated resins can be used. Conventionally, the resin blend contains amine-terminated resins and/or chain extenders and not any hydroxyl reactive polymer components Polyurea has been used to coat such items as secondary containment, manholes, tunnels, bridges, railways, pipelines, parking decks, tank liners, roofing, flooring, marine craft, water treatment lining, and truck beds. Furthermore, it has excellent adhesion properties for concrete and steel, provided these surfaces have been prepared and primed properly. It can also be used as an aquarium lining as well as for other types of water containment, such as landscape ponds, water features, and fuel pits. Other applications are spray molding and coating armor. It makes an excellent sealant, joint-filler, caulk for most any surface, and is crack-resistant. Another benefit of polyurea is that it helps prevent bacterial growth. This makes it an idea material for wall cavities and other hard to reach places. Polyurea is also corrosion-resistant, abrasion-resistant, and enhances the structural integrity of the surface to which it is applied.

Some polyurea products provide a tough coating and are capable of strengths of 6000 psi (40 MPa) tensile and more than 500% elongation. Several coats can be applied to a surface quickly due to polyurea's fast drying or cure time. A property of one polyurea elastomer-based material is its melding together or "self-healing" ability. Even when the material.

Each of the two-components used to generate polyurea coatings are typically shipped as a two-part system, with an isocyanate-containing material and an amine-containing resin blend supplied in 55-gallon drum sets into fluid handling system for pre-heating and metering. The fluid handling system then delivers the parts A and B materials through heated hoses to a spray gun in a precise ratio (usually 1:1). Polyurea coatings have a set time that is measured in seconds, so it is crucial that the chemicals do not mix until the instant before they leave the gun. Otherwise, the material will set up and harden inside the gun. Prior art processing and application of spray polyurea coatings requires the use of high-pressure, high temperature impingement mixing equipment. The ability to heat the individual components of a polyurea coating prior to mixing and spraying is a key to successful coating application so as to provide the correct system viscosity to provide the right mixture characteristics and improve coating performance and appearance.

The inventors herein have successfully applied polyurea coatings from the low pressure application systems of the present disclosure from unpressurized parts A and B materials supplies. This was unexpected at least because the prior art requires impingement mixing of these coatings. It is believed that the enhanced fluid mixing generated by the inline air inputs in the metal spray gun generate a mixing operation that is suitable for application of polyurea coatings substantially without the generation of aerosolized components at the point of spray dispensing.

As a further enhancement to existing processes for insulation and molding, the methods and systems herein can be operational via a mobile application, such as a cell phone or tablet application. The componentry can be operated via such applications when configured for communication via WiFi, Bluetooth, cell signal, etc. Real-time data collection can further enhance the operation of the systems and methods. Such real-time data collection can allow off-site expertise to be available on an as-needed basis. For example, a technician who is experiencing difficulties in an SPF installation or in mold filling can be put into communication with an offsite expert for diagnosis of one or more reasons that the installation may not be proceeding as expected. Information associated with a current SPF application event can be provided to the off-site expert for evaluation. The offsite expert can provide guidance to the technician about why a SPF application process may not be proceeding as expected or intended. For example, when a SPF is not exiting the mixing nozzle in a correct consistency, the off-site expert may be able to identity the cause.

Yet further, the data associated with a current SPF installation or mold-filling event can be evaluated against a library of historical information for a collection of prior SPF installation events. The collection of prior SPF installation or molding events can include information about type of installation (e.g., residential construction, commercial construction, new construction, remodel, etc.) environmental conditions at the jobsite, materials characteristics (e.g., type, manufacturer, lot number, storage history, etc.), fluid handling system settings, installer information (e.g., contractor name, technician name, location), among other information that can be collected. The collection of data can be evaluated to provide recommendations for a current SPF installation event, for example, formulation selections, fluid handling equipment settings, spray nozzle selection or the like.

Such collection of historical information can also be evaluated to identify whether and to what extent problems are associated with one or more parameters in a SPF installation. For example, it might be determined that a particular SPF formulation may be more likely to cause a spray gun to clogged in lesser time. Or, that a type of formulation generates a better SPF at a lower or higher pre-treating temperature. By collection of such information from real-time operation in actual use cases it can be expected that better formulations, equipment, and application methods may be generated for SPF.

Instructions can be provided for a particular SPF use case, raw material types, etc. For example, the fluid handling equipment can be configured to independently communicate each of the raw materials supplies from their respective containers via fluid supply conduits through the fluid handling equipment in a metered for pre-heating in accordance with instructions input by a user or by pre-programmed instructions. The pre-heated and metered raw materials streams can then be communicated to and through a hose engaged with the metal spray gun configured as set out herein. The amount of SPF applied according to the user or computer instructions will vary, as would be appreciated.

Figure 6:
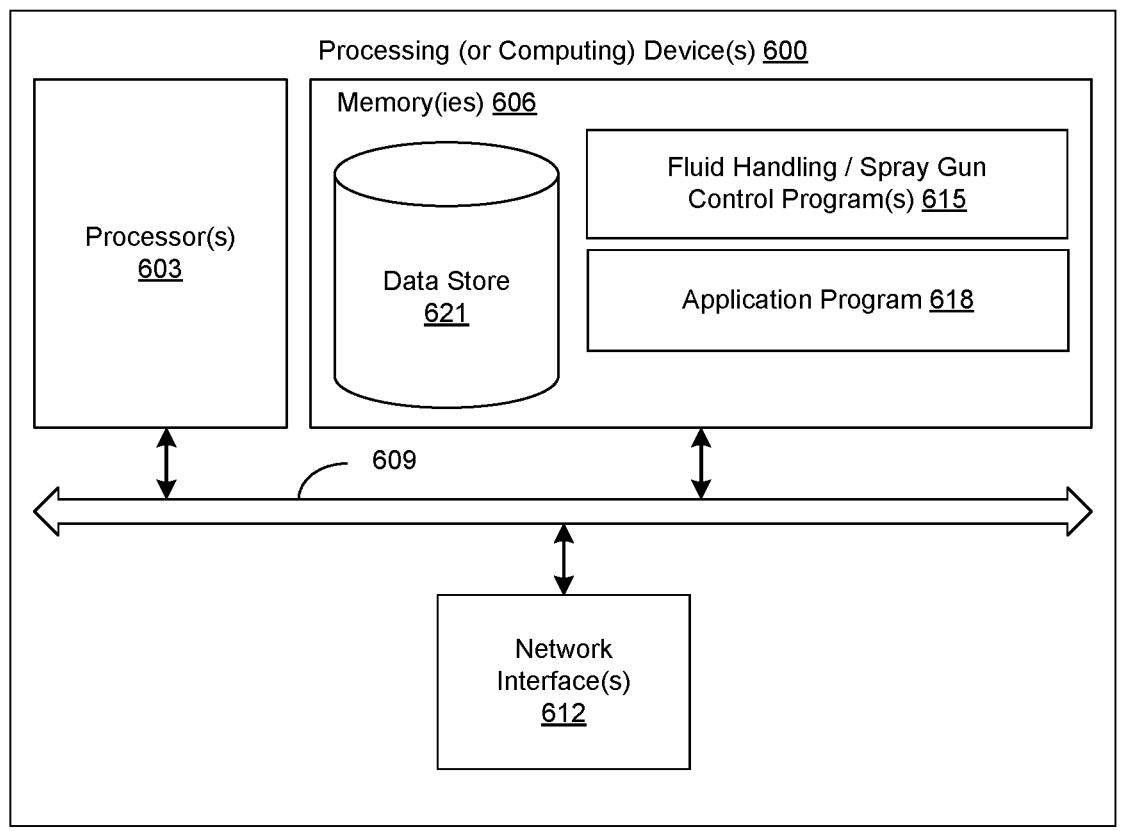
FIG. 6 is a schematic diagram illustrating an example of a processing (or computing) device for fluid handling and/or spray gun control, in accordance with various embodiments of the present disclosure.

Referring next to FIG. 6, shown is a schematic diagram illustrating an example of a processing (or computing) device 600 that can be used for fluid handling and/or spray gun control such as in, e.g., SPF delivery or other applications, in accordance with various embodiments of the present disclosure. The processing (or computing) device 600 can comprise one or more computing/processing device such as, e.g., a computer, controller, smartphone, tablet, etc. The processing (or computing) device 600 can include processing circuitry comprising at least one processor circuit, for example, having a processor 603 and a memory 606, both of which are coupled to a local interface 609. The local interface 609 may comprise, for example, a data bus with an accompanying address/control bus or other bus structure as can be appreciated.

In some embodiments, the processing (or computing) device 600 can include one or more network interfaces 612. The network interface 612 may comprise, for example, a wireless transmitter, a wireless transceiver, and/or a wireless receiver. The network interface 612 can communicate to a remote computing/processing device or other components using a Bluetooth, WiFi, or other appropriate wireless protocol. As one skilled in the art can appreciate, other wireless protocols may be used in the various embodiments of the present disclosure. The network interface 612 can also be configured for communications through wired connections.

Stored in the memory 606 are both data and several components that are executable by the processor(s) 603. In particular, stored in the memory 606 and executable by the processor 603 can be fluid handling/spray gun control application(s) 615 which can, e.g., control operation of the fluid handling system and/or spray gun as disclosed herein, and potentially other applications 618. In this respect, the term "executable" means a program file that is in a form that can ultimately be run by the processor(s) 603. Also stored in the memory 606 may be a data store 621 and other data. In addition, an operating system may be stored in the memory 606 and executable by the processor(s) 603. It is understood that there may be other applications that are stored in the memory 606 and are executable by the processor(s) 603 as can be appreciated.

Examples of executable programs may be, for example, a compiled program that can be translated into machine code in a format that can be loaded into a random access portion of the memory 606 and run by the processor(s) 603, source code that may be expressed in proper format such as object code that is capable of being loaded into a random access portion of the memory 606 and executed by the processor(s) 603, or source code that may be interpreted by another executable program to generate instructions in a random access portion of the memory 606 to be executed by the processor(s) 603, etc. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores, and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, ultrasound or other devices. The processor 603 may be of electrical or of some other available construction.

Although the fluid handling/spray gun control application(s) 615, and other various applications 618 described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

Also, any logic or application described herein, including the fluid handling/spray gun control application(s) 615, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the fluid handling/spray gun control application(s) 615, may be implemented and structured in a variety of ways. For example, one or more applications described may be implemented as modules or components of a single application. For example, the fluid handling/spray gun control application(s) 615 can include a wide range of modules such as, e.g., an initial model or other modules that can provide specific functionality for the disclosed methodology. Further, one or more applications described herein may be executed in shared or separate computing/processing devices or a combination thereof. For example, a plurality of the applications described herein may execute in the same processing (or computing) device 600, or in multiple computing/processing devices in the same computing environment. To this end, each processing (or computing) device 600 may comprise, for example, at least one server computer or like device, which can be utilized in a cloud based environment.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

Therefore, at least the following is claimed:

1. A method of applying a polyurethane spray foam onto a surface or into a mold, comprising:
providing a system comprising each of:
a) a polyurethane spray foam ("SPF") raw material supply comprising each of:
  i) an isocyanate-containing part A material stored in a first unpressurized container; and
  ii) a polyol-containing part B material stored in a second unpressurized container;
    wherein either or both of the part A or part B materials incorporate an amount of particles, and an agitator system is engaged with each of the part A and part B unpressurized containers, the agitator system being configured to provide mixing of the part A and part B materials prior to delivery of each into respective part A and part B materials conduits;
b) a fluid handling system comprising:
  i) a controller configured for execution of instructions;
  ii) the part A material conduit having each of a part A material stream entrance and a part A conduit exit;
  iii) the part B material conduit having each of a part B material stream entrance and a part B conduit exit;
  iv) at least one pump configured to convey the SPF raw material supply from the first and second unpressurized containers in separate part A and part B material streams into and through each of the part A and part B material conduits, wherein operation of the at least one pump is managed by the controller;
  v) at least one heater configured to heat each of the part A and part B material streams, wherein operation of the at least one heater is managed by the controller;
  vi) a power source; and
  vii) electrical communications capability;
c) an air source configured to convey first and second air streams each having a flow rate defined by instructions associated with the fluid handling system;
d) a heated hose having a proximal end, a distal end, and a length, wherein the heated hose comprises:
  i) an exterior covering;
  ii) a heated hose part A material conduit defining a portion of a part A material stream path from a location adjacent to the fluid handling system part A conduit exit to and through the length of the heated hose, wherein the heated hose part A material conduit at the proximal end of the heated hose is configured for engagement with the fluid handling system at the part A conduit exit;
  iii) a heated hose part B material conduit defining a portion of a part B material stream path from a location adjacent to the fluid handling system part B conduit exit to and through the length of the heated hose, wherein the heated hose part B material conduit at the proximal end of the heated hose is configured for engagement with the fluid handling system at the part B conduit exit;
  iv) heated hose first and second air stream conduits, wherein a proximal end of each of the heated hose first and second air stream conduits is configured for engagement with first and second air conduits of the air source at the proximal end of the heated hose;
  v) heated hose wiring configured to provide electrical communication between the fluid handling system and the heated hose, wherein a proximal end of the heated hose wiring is configured for engagement with fluid handling system wiring at the proximal end of the heated hose; and
  vi) one or more heating elements configured to substantially maintain a target temperature of each of the part A and part B material streams when each of the part A and part B material streams are flowing in their respective heated hose part A and part B material conduits along the length of the heated hose;
e) a whip hose having a length, a proximal end and a distal end, wherein the whip hose comprises:
  i) a whip hose part A material conduit defining a portion of the part A material stream path from a location adjacent to the distal end of the heated hose, wherein the whip hose part A material conduit at the proximal end of the whip hose is configured for engagement with the heated hose at the distal end of the heated hose;
  ii) a whip hose part B material conduit defining a portion of the part B material stream path from a location adjacent to the distal end of the heated hose, wherein the whip hose part B material conduit at the proximal end of the whip hose is configured for engagement with the heated hose at the distal end of the heated hose;
  iii) whip hose first and second air stream conduits, wherein each of the whip hose first and second air stream conduits at the proximal end of the whip hose is configured for engagement with each of the heated hose first and second air source conduits at the distal end of the heated hose; and
  iv) whip hose wiring configured to provide electrical communication between the heated hose and the whip hose, wherein a proximal end of the whip hose wiring is configured for engagement with the heated hose wiring at the proximal end of the whip hose; and
f) a metal spray gun configured with each of:
  i) an assembly comprising a forward manifold, a materials entry part, and a rear part, wherein:
    1) The materials entry part comprises each of a part A material entry port and a part B material entry port configured for engagement with each of the distal end of the whip hose part A and part B material conduits, wherein each of the part A and part B material entry ports are in communication with each of part A and part B material flow paths defined by respective through-between openings in each of the materials entry part and the forward manifold;
    2) The assembly includes each of part A and part B air inputs in fluid communication with the respective part A and part B material flow paths, wherein each of the part A and part B air inputs are located forward of each of the respective part A and part B material entry ports;
    3) The forward manifold comprises a front side protuberance configured to communicate each of the part A and part B materials out of the assembly as separate material streams when the part A and part B material streams are conveyed from the SPF raw material supply to the spray gun; and
    4) the assembly and rear part are engaged with valving configured to start and stop the part A and part B material stream flow;

ii) a trigger; and
iii) a handle;
generating, by the system, each of the part A and part B material streams, either or both of which comprise particles;
conveying, by the system, each of the part A and part B material streams through the system and into a disposable mixing nozzle engaged with the front side protuberance; and
applying, via the disposable mixing nozzle, a mixture of the part A and part B material streams to a surface or into a mold at a pressure of 250 psi or less.

2. The method of claim 1, wherein the particles included in either or both of the part A and part B material streams comprise a fire-retardant/resistant intumescent material.

3. The method of claim 1, wherein:
a) an interior of the disposable mixing nozzle includes a static mixing element; and
b) the static mixing element is approximately as long as an interior length of the disposable mixing nozzle.

4. The method of claim 1, wherein:
a) an interior of the disposable mixing nozzle includes a static mixing element;
b) the static mixing element has a length shorter than an interior length of the disposable mixing nozzle; and
a distal end of the static mixing element is positioned proximal to a SPF mixture dispensing end of the nozzle.

5. The method of claim 1, wherein the mixture is dispensed onto the surface from the disposable mixing nozzle at a volume of up to about 30 pounds per minute.

6. The method of claim 1, wherein a low global warming potential liquid blowing agent is incorporated into the part B material.

7. The method of claim 1, wherein the spray gun further comprises water flush capability provided by a water stream communicated via a water conduit from the fluid handling system through a water conduit in each of the heated hose and the whip hose into a water input port configured in line with the part B material flow path in the assembly.

8. The method of claim 1, wherein the instructions are fully or partially provided by a computer, and wherein the instructions are either or both of:
a) stored in memory associated with the fluid handling system; or
b) provided by a mobile device associated with a technician located proximate to the fluid handling system.

9. The method of claim 1, comprising a plurality of sensors configured to collect information about operation of the system during a current polyurethane spray foam application event, wherein when operational in the current polyurethane spray foam application event the collected information is configured for use in the current polyurethane spray foam application event or is stored for use in a subsequent polyurethane spray foam application event.

10. The method of claim 1, wherein the fluid handling system is configured with a mechanically linked pump, thereby providing substantially accurate metering of the part A and part B materials into and through each of the heated hose, the whip hose, and the spray gun.

11. The method of claim 1, wherein the system is incorporated in a mobile trailer, thereby providing a polyurethane spray foam application method deliverable at a plurality of locations.

12. The method of claim 1, wherein the fluid handling system is configured to generate a maximum pressure rating of about 500 psi.

13. The method of claim 1, wherein the particles are incorporated in each of the part A and part B unpressurized containers.

14. A polyurethane spray foam coating generated from the method of claim 1, wherein the coating is applied on a surface at a thickness of from about 0.5 inches to about 12 inches.

15. The polyurethane spray foam coating of claim 14, wherein the particles are dispersed substantially uniformly throughout the thickness of the coating.

16. The polyurethane spray foam coating of claim 14, wherein the particles comprise an intumescent material.

17. The polyurethane spray foam coating of claim 16 having a Class A flame spread rating of less than about 25 as defined by one or more of ASTM-E-84-22, UL-723 (2018) or NFPA 255 (2006).

18. The polyurethane spray foam coating of claim 16 having the Class A flame spread rating without application of a fire-resistant top coating or drywall to an exposed surface of the coating.

19. The polyurethane coating of claim 14, wherein the particles comprise a material configured to impart conductive properties to the coating when applied to a pipeline configured for delivery of an electrical current along a length thereof.

* * * * *